(12) United States Patent
Nakata et al.

(10) Patent No.: US 8,114,208 B2
(45) Date of Patent: Feb. 14, 2012

(54) INK JET INK, INK JET RECORDING METHOD, INK CARTRIDGE, RECORDING UNIT AND INK JET RECORDING APPARATUS

(75) Inventors: Eiichi Nakata, Saitama (JP); Hiroshi Tomioka, Tokyo (JP); Yukako Tamanuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/422,635

(22) Filed: Apr. 13, 2009

(65) Prior Publication Data

US 2009/0274839 A1 Nov. 5, 2009

(30) Foreign Application Priority Data

May 2, 2008 (JP) ................................. 2008-120088

(51) Int. Cl.
  *C09D 11/02* (2006.01)
(52) U.S. Cl. .................................................. 106/31.48
(58) Field of Classification Search ................ 106/31.48
  See application file for complete search history.

(56) References Cited

U.S. PATENT DOCUMENTS

| | | | |
|---|---|---|---|
| 4,723,129 A | 2/1988 | Endo et al. | 346/1.1 |
| 4,740,796 A | 4/1988 | Endo et al. | 346/1.1 |
| 5,738,932 A | 4/1998 | Kondo et al. | 428/195 |
| 5,804,320 A | 9/1998 | Tomioka et al. | 428/478.2 |
| 5,955,185 A | 9/1999 | Yoshino et al. | 428/304.4 |
| 5,965,252 A | 10/1999 | Santo et al. | 428/329 |
| 6,460,989 B1 | 10/2002 | Yano et al. | 347/101 |

(Continued)

FOREIGN PATENT DOCUMENTS

EP 1 847 570 A1 10/2007

(Continued)

OTHER PUBLICATIONS

*Kagaku No Ryoiki* (Chemical Regions), extra edition, No. 122, pp. 96-103, 1979.

(Continued)

*Primary Examiner* — Jerry Lorengo
*Assistant Examiner* — Veronica F Faison
(74) *Attorney, Agent, or Firm* — Fitzpatrick, Cella, Harper & Scinto

(57) ABSTRACT

An ink jet ink including at least a compound represented by the following general formula (I) and organic solvents. When the organic solvents are classified by $M_{OH}/M_W$ indicating a proportion of the molecular weight of hydroxyl group to the molecular weight of the organic solvents into an organic solvent A whose $M_{OH}/M_W$ is 0 or more and less than 0.2, an organic solvent B whose $M_{OH}/M_W$ is 0.2 or more and less than 0.4, and an organic solvent C whose $M_{OH}/M_W$ is 0.4 or more and less than 1.0, the ink contains at least one organic solvent A, at least one organic solvent B and at least one organic solvent C. The at least one organic solvent A contains a nitrogen-containing organic solvent in an amount of 80.0% by mass or more of the at least one organic solvent A.

General formula (I)

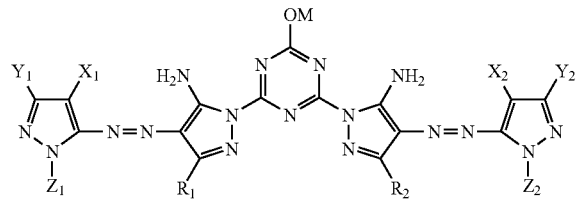

9 Claims, 7 Drawing Sheets

U.S. PATENT DOCUMENTS

| | | | |
|---|---|---|---|
| 6,517,199 B1 | 2/2003 | Tomioka et al. | 347/101 |
| 6,536,890 B1 | 3/2003 | Kato et al. | 341/100 |
| 6,558,740 B1 | 5/2003 | Santo et al. | 427/146 |
| 6,565,950 B1 | 5/2003 | Tomioka et al. | 428/195 |
| 6,659,601 B2 | 12/2003 | Goto et al. | 347/100 |
| 6,685,999 B2 | 2/2004 | Ichinose et al. | 428/32.25 |
| 6,719,420 B2 | 4/2004 | Tomioka et al. | 347/100 |
| 6,729,718 B2 | 5/2004 | Goto et al. | 347/100 |
| 6,746,114 B2 | 6/2004 | Takahashi et al. | 347/100 |
| 6,821,328 B2 | 11/2004 | Tomioka et al. | 106/31.33 |
| 6,830,709 B2 | 12/2004 | Tomioka et al. | 252/506 |
| 6,863,391 B2 | 3/2005 | Tomioka et al. | 347/100 |
| 7,025,817 B2 | 4/2006 | Kanke et al. | 106/31.51 |
| 7,198,837 B1 | 4/2007 | Endo et al. | 428/195.1 |
| 7,208,033 B2 | 4/2007 | Kawabe et al. | 106/31.48 |
| 7,229,166 B2 | 6/2007 | Tomioka et al. | 347/100 |
| 7,244,299 B2 | 7/2007 | Tsuji et al. | 106/31.48 |
| 7,445,666 B2 | 11/2008 | Yanagimachi et al. | 106/31.47 |
| 7,594,719 B2 | 9/2009 | Tomioka et al. | 347/100 |
| 2008/0136862 A1 | 6/2008 | Kawabe et al. | 347/29 |
| 2008/0145561 A1 | 6/2008 | Kitamura et al. | 427/466 |
| 2008/0151028 A1 | 6/2008 | Yamakami et al. | 347/100 |
| 2008/0274283 A1 | 11/2008 | Tateishi et al. | 427/256 |
| 2009/0095199 A1 | 4/2009 | Aikawa et al. | 106/31.47 |
| 2009/0214789 A1 | 8/2009 | Tomioka et al. | 427/256 |
| 2009/0238974 A1 | 9/2009 | Kawabe et al. | 427/256 |
| 2009/0238975 A1 | 9/2009 | Yamakami et al. | 427/256 |
| 2009/0238976 A1 | 9/2009 | Ishii et al. | 427/256 |
| 2009/0238977 A1 | 9/2009 | Kawabe et al. | 427/256 |

FOREIGN PATENT DOCUMENTS

| | | |
|---|---|---|
| EP | 2 048 204 A1 | 4/2009 |
| WO | WO 2006/082669 A1 | 8/2006 |
| WO | WO 2007/088724 A1 | 8/2007 |
| WO | WO 2008/013221 A1 | 1/2008 |

OTHER PUBLICATIONS

Aug. 12, 2009 European Search Report in European Patent Application No. 09005655.7.

INK JET INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink jet ink, an ink jet recording method, an ink cartridge, a recording unit and an ink jet recording apparatus.

2. Related Background Art

An ink jet recording method is such a recording method that minute droplets of ink are applied to a recording medium such as plain paper or glossy medium, thereby forming an image, and is rapidly spread because of low cost and improved recording speed. With rapid spreading of digital cameras in addition to development of high-quality images obtainable by the ink jet recording method, the ink jet recording method is now commonly used as an output method of images comparable with silver halide photography.

In recent years, development of higher-quality images obtained by the ink jet recording method has been further advanced than before due to use of extremely fine ink droplets and improved color ranges attending on introduction of multiple color inks. However, requirements for coloring materials and inks have become greater on the other hand, and there is a demand for higher-level properties for improvement of color developability and reliability such as clogging prevention and ejection stability.

On one hand, the ink jet recording method involves such a problem that the resulting recorded article is poor in image preservability. In general, a recorded article obtained by an ink jet recording method involves such a problem that the image preservability thereof is poor compared with a silver halide photograph. More specifically, when the recorded article is exposed to light, humidity, heat or ozone gas present in the air for a long period of time, such a problem that a coloring material on the recorded article is deteriorated, and so change in color tone of the image or color fading is liable to occur is caused.

A great number of proposals have heretofore been made in order to improve the preservability of an image formed with a yellow ink using a coloring material particularly low in light fastness among coloring materials of various colors. For example, a yellow coloring material capable of forming an image very excellent in ozone gas fastness and light fastness and excellent in color developability has been proposed (see International Publication No. WO 2006/082669).

SUMMARY OF THE INVENTION

A compound represented by the following general formula (I) is a yellow coloring material designed so that the oxidation potential of the molecule is to be noble by introducing a high electron-withdrawing functional group into the molecule. By designing the compound in this manner, the coloring material (compound) is inhibited from being oxidized by an oxidizing agent such as ozone gas. As a result, the ozone fastness and light fastness of an image formed with an ink containing the compound represented by the following general formula (I) as a coloring material are very excellent,

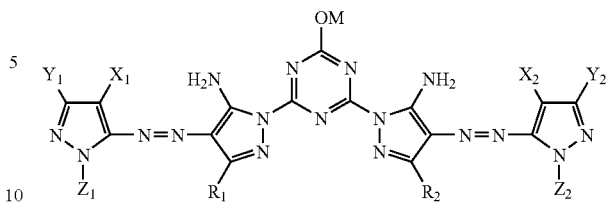

General formula (I)

wherein $R_1$, $R_2$, $Y_1$ and $Y_2$ are, independently of one another, a monovalent group, $X_1$ and $X_2$ are, independently of each other, an electron-withdrawing group having a Hammett's σp value of 0.20 or more, $Z_1$ and $Z_2$ are, independently of each other, a hydrogen atom or a group selected from the group consisting of the following substituents: a substituted or unsubstituted alkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group, and M is a hydrogen atom, an alkali metal, an ammonium or an organic ammonium.

In the process of making an investigation as to the yellow coloring material represented by the general formula (I), the present inventors have found a problem peculiar to this coloring material. As described previously, this coloring material is designed to have a molecular structure that is hard to be oxidized. In other words, it has such a molecular structure that an electron is hard to be released to the outside. Therefore, the coloring material is easy to accept an electron from the outside to the contrary, i.e., easy to be subjected to a nucleophilic reaction. It has also been found as a problem caused by this fact that when an ink containing the compound (coloring material) represented by the general formula (I) is stored under prescribed conditions, a phenomenon of decomposition of the coloring material in the ink may be caused in some cases. According to an investigation by the present inventors, it has been clarified that in this phenomenon, an organic solvent in the ink causes a nucleophilic reaction to the coloring material, and consequently the decomposition of the coloring material is caused.

It has further been found that when this yellow coloring material is decomposed, desired performance is not achieved with respect to the light fastness, color developability and color tone of the ink. In addition, it has been found that the decomposition rate of this coloring material varies according to the kind of the organic solvent contained in the ink, and the decomposition is more facilitated as the proportion of the molecular weight of the hydroxyl group making up an organic solvent to the molecular weight of the organic solvent ($M_{OH}/M_W$) with respect to the structure of the organic solvent increases.

Thus, the present inventors have attempted to simply prepare an ink with only organic solvents having a small proportion $M_{OH}/M_W$ for the purpose of inhibiting the decomposition of the compound (coloring material) represented by the general formula (I), which is caused in the ink. As a result, it has been found that although the decomposition of the coloring material is inhibited, the ink of such constitution is markedly lowered in reliability such as sticking resistance and ejection stability, and properties of an ink jet ink are impaired. In other words, it has been found that there is a necessity of suitably selecting the kind and mixing ratio of an organic solvent contained in an ink in order to improve the decomposition resistance of the coloring material in the ink and satisfy the reliability.

From the results of these investigations, the present inventor has concluded that when the compound represented by the general formula (I) is used as a coloring material of an ink jet ink, there is a necessity of establishing a constitution satisfying both decomposition resistance and reliability as an ink.

Accordingly, it is an object of the present invention to provide an ink jet ink which solves the problem of the decomposition of the compound represented by the general formula (I), provides an image exhibiting very excellent ozone fastness and light fastness and is excellent in reliability as the ink, in particular, sticking resistance and ejection stability. Another object of the present invention is to provide an ink jet recording method, an ink cartridge, a recording unit and an ink jet recording apparatus that can stably provide the image having the excellent properties by using the above-described ink jet ink.

The above objects can be achieved by the present invention described below. More specifically, the present invention provides an ink jet ink comprising at least a compound represented by the following general formula (I) and organic solvents, wherein when the organic solvents are classified by $M_{OH}/M_W$ indicating the proportion of the molecular weight of hydroxyl group to the molecular weight of the organic solvents into an organic solvent A whose $M_{OH}/M_W$ is 0 or more and less than 0.2, an organic solvent B whose $M_{OH}/M_W$ is 0.2 or more and less than 0.4, and an organic solvent C whose $M_{OH}/M_W$ is 0.4 or more and less than 1.0, the ink contains at least one organic solvent A, at least one organic solvent B and at least one organic solvent C, and wherein the at least one organic solvent A contains a nitrogen-containing organic solvent in an amount of 80.0% by mass or more of the at least one organic solvent A,

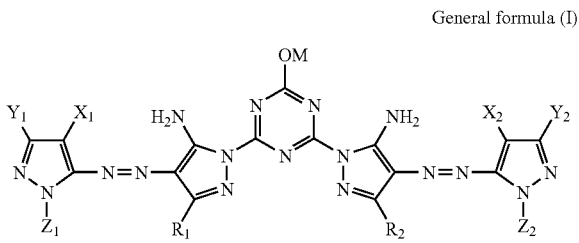

General formula (I)

wherein $R_1$, $R_2$, $Y_1$ and $Y_2$ are, independently of one another, a monovalent group, $X_1$ and $X_2$ are, independently of each other, an electron-withdrawing group having a Hammett's σp value of 0.20 or more, $Z_1$ and $Z_2$ are, independently of each other, a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M is a hydrogen atom, an alkali metal, an ammonium or an organic ammonium.

An ink jet recording method according to another embodiment of the present invention is an ink jet recording method comprising ejecting an ink by an ink jet system to conduct recording on a recording medium, wherein the ink is the ink jet ink according to the present invention.

An ink cartridge according to a further embodiment of the present invention is an ink cartridge comprising an ink storage portion storing an ink, wherein the ink is the ink jet ink according to the present invention.

A recording unit according to a still further embodiment of the present invention is a recording unit comprising an ink storage portion storing an ink and a recording head for ejecting the ink, wherein the ink is the ink jet ink according to the present invention.

An ink jet recording apparatus according to a yet still further embodiment of the present invention is an ink jet recording apparatus comprising an ink storage portion storing an ink and a recording head for ejecting the ink, wherein the ink is the ink jet ink according to the present invention.

According to the present invention, a yellow ink jet ink which solves the problem of the decomposition of the compound represented by the general formula (I), provides an image exhibiting very excellent ozone fastness and light fastness and is excellent in reliability as the ink, in particular, sticking resistance and ejection stability is provided. According to other embodiments of the present invention, an ink jet recording method, an ink cartridge, a recording unit and an ink jet recording apparatus that can stably provide the image having the excellent properties by using the above-described ink jet ink are provided.

Further features of the present invention will become apparent from the following description of exemplary embodiments with reference to the attached drawings.

DETAILED DESCRIPTION OF THE EMBODIMENTS

Figure 1:
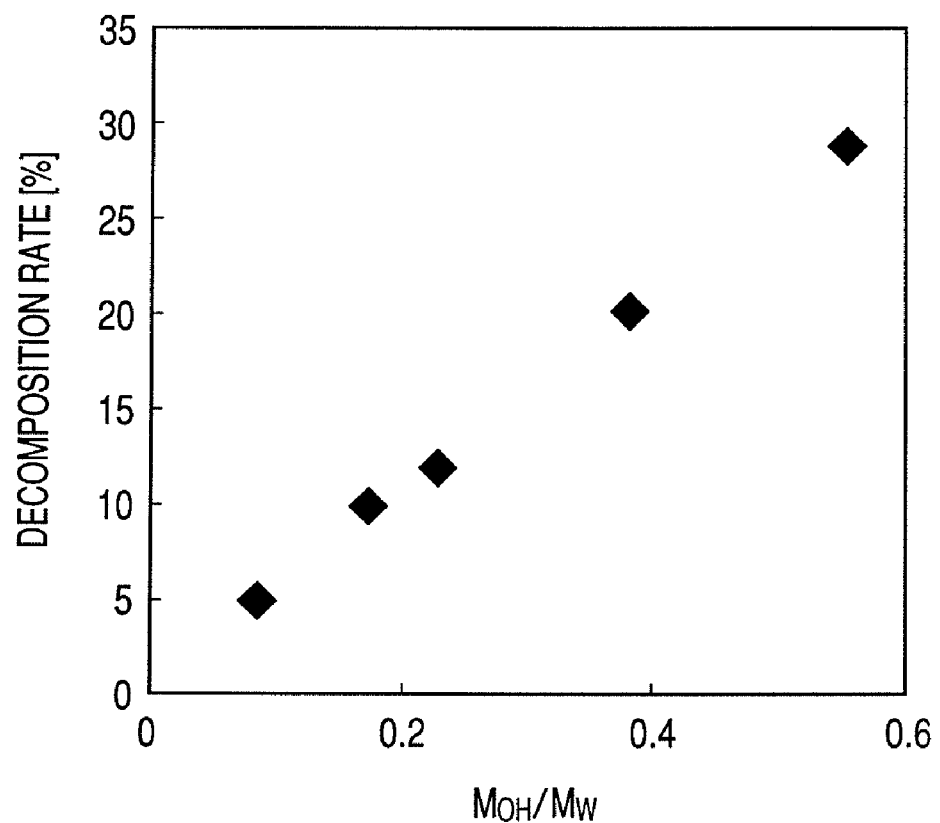
FIG. 1 diagrammatically illustrates the relation between the proportion $M_{OH}/M_W$ of organic solvents and the decomposition rate of a compound represented by the general formula (I).

The present invention will hereinafter be described in detail by exemplary embodiments. Incidentally, when a compound is a salt, the salt is present in an ink being dissociated into ions. In the present invention, however, the ink is expressed with the phrase "containing the salt" for the sake of convenience. In the following description, compounds represented by the general formula (I), the general formula (II) and the general formula (III) may be shortened and described as "compound of the general formula (I)", "compound of the general formula (II)" and "compound of the general formula (III)", respectively. In the present invention, even when an organic solvent or nitrogen-containing organic solvent is solid at ordinary temperature (20 to 25° C.), such a solvent is included in the organic solvent or nitrogen-containing organic solvent so far as it can dissolve or disperse a component such as a coloring material when it is dissolved in water to provide an aqueous solution.

Among yellow, magenta and cyan inks widely used as ink jet inks, the yellow ink in particular tends to be poor in fastness property as described above. Thus, the present inventors have carried out various investigations on coloring materials usable in the yellow ink. As a result, attention has been directed to the fact that compounds of the following general formula (I) described in International Publication No. WO 2006/082669, inter alia compounds of the following general formula (II), are excellent in fastness property and color developability and suitable for use as coloring materials of inks, General formula (I)

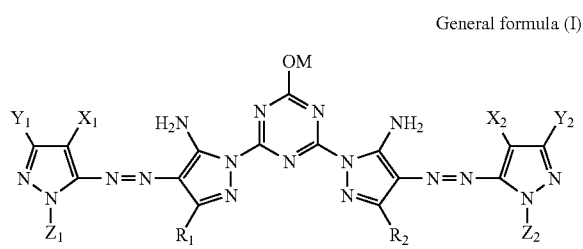

wherein $R_1$, $R_2$, $Y_1$ and $Y_2$ are, independently of one another, a monovalent group, $X_1$ and $X_2$ are, independently of each other, an electron-withdrawing group having a Hammett's σp value of 0.20 or more, $Z_1$ and $Z_2$ are, independently of each other, a hydrogen atom or any group selected from the group consisting of the following substituents: a substituted or unsubstituted alkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group, and M is a hydrogen atom, an alkali metal, an ammonium or an organic ammonium, molecule. Thereby, the molecule of the coloring material is prevented from being oxidized by an oxidizing agent such as ozone gas. As a result, such a coloring material is very excellent in fastness property. Since the coloring material is designed to be a molecular structure hard to be oxidized, i.e., such a molecular structure that an electron is hard to be released to the outside, the coloring material is easy to accept an electron from the outside to the contrary, i.e., easy to cause a nucleophilic reaction. As a result of an investigation by the present inventors, it has been clarified that when the compound of the general formula (I) or the compound of the general formula (II) is used as a coloring material of an ink, the coloring material thereby causes an electrophilic reaction by an organic solvent contained in the ink, and the coloring material itself is decomposed.

More specifically, the present inventors obtained the following investigation results. An aqueous solution containing 25.0% by mass of glycerol, 3.0% by mass of the compound of the general formula (I) or the compound of the general formula (II) and 72.0% by mass of water was first prepared. The resultant aqueous solution was stored for 7 days under the condition of a temperature of 70° C., and the peak of the compound was determined by means of high-performance liquid chromatography (HPLC) as to the solution before and after the storage. The rate of decrease of the peak area of the compound before and after the storage was found and regarded as a decomposition rate of the compound. As a result, it was clarified that 28% or more of the compound of the general formula (I) or the compound of the general formula (II) contained in this aqueous solution is decomposed. It was also found that in an image formed with the aqueous solution after the storage, desired performance is not General formula (II)

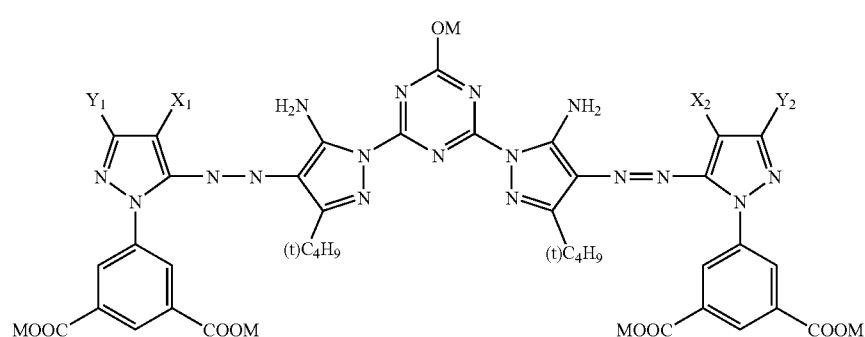

wherein $X_1$ and $X_2$ are, independently of each other, an electron-withdrawing group having a Hammett's σp value of 0.20 or more, $Y_1$ and $Y_2$ are, independently of each other, a monovalent group, and M's are, independently of one another, a hydrogen atom, an alkali metal, an ammonium or an organic ammonium.

The present inventors then prepared inks containing the compound of the general formula (I) or the compound of the general formula (II) as a coloring material and carried out investigations on various images and reliability of the inks. As a result, it has been found that the following three problems are involved.

The first problem is decomposition of the coloring material as described below. The compound of the general formula (I) or the compound of the general formula (II) is designed so that the oxidation potential of the molecule is high by introducing a high electron-withdrawing functional group into the achieved as to fastness property and color tone due to the decomposition of these compounds.

In consequence of this observation, it is essential to prepare an ink taking the decomposition tendency of the above-described coloring material into consideration so far as this coloring material is used. As a result of a more detailed investigation by the present inventors, it was found that examples of an organic solvent particularly facilitating the decomposition of the coloring material when it is used in combination with the coloring material include glycerol and ethylene glycol. As a result of a further investigation from this fact, it was found that the decomposition of the coloring material is facilitated when an organic solvent with a large proportion of the molecular weight of hydroxyl group to the molecular weight of the organic solvent [$M_{OH}/M_W$ ($M_W$: molecular weight of the organic solvent; $M_{OH}$: total molecular weight of all hydroxyl group(s) in the molecule of the organic solvent)] is used in combination with the coloring material. This is considered to be attributable to the effect that a nucleophilic reaction to the compound (coloring material) of the general formula (I) or the general formula (II) by the hydroxyl group is more facilitated as the total number of hydroxyl groups derived from the organic solvent contained in an ink per unit mass increases. Accordingly, in order to improve the decomposition resistance of the coloring material in the ink, it is necessary to select an organic solvent having a proportion $M_{OH}/M_W$ within a suitable range as an organic solvent contained in the ink. Incidentally, the decomposition resistance of the compound (coloring material) in the present invention means the degree of facilitating decomposition of the compound (coloring material) by the organic solvent in the ink (aqueous solution) is low.

The second problem is reliability (sticking resistance) of an ink jet ink as described below. In order to improve the decomposition resistance of the compound of the general formula (I) or the compound of the general formula (II) as described as the first problem, the present inventors prepared an ink with only an organic solvent hard to decompose the coloring material, i.e., an organic solvent having a small proportion $M_{OH}/M_W$. The resultant ink was used to carry out various investigations.

Specifically, after the ink obtained above was charged into an ink jet recording apparatus and the ink jet recording apparatus was left to stand for a long period of time, recoverability with which normal ejection becomes feasible was investigated. As a result, it was found that some ink jet recording apparatus are poor in ejection-recoverability to cause ejection failure. When a nozzle of a recording head which had caused the ejection failure was observed, deposition of the coloring material was observed in the vicinity of an ejection orifice though an ejection-recovery operation was conducted. From this result, it was found that when only the organic solvent having the effect to inhibit the decomposition of the coloring material is simply selected, the sticking resistance of the resulting ink is markedly lowered to impair the reliability of the ink. Thus, the present inventors came to conclusion that when an ink containing the coloring material is prepared, there is a necessity of using an organic solvent having a small proportion $M_{OH}/M_W$ and an organic solvent having a great proportion $M_{OH}/M_W$ in combination. Taking into account such conclusion, a further investigation was made. As a result, the following constitution was found. Specifically, the constitution of an ink using the organic solvent having a small proportion $M_{OH}/M_W$ and the organic solvent having a great proportion $M_{OH}/M_W$ at a proper ratio in combination made it possible to solve the problem of the decomposition resistance of the coloring material and the problem of the sticking resistance of the ink at the same time to possess both of them. Incidentally, the condition that the ink is excellent in sticking resistance in the present invention means the following. Namely, this means that the number of ejection-recovery operations required to recover normal ejection against that clogging of a recording head with the coloring material deposited in the vicinity of an ejection orifice which may be caused when the ink is left to stand for a long period of time in a state charged into the apparatus is small. In other words, an ink excellent in sticking resistance enables normal ejection with a smaller number of recovery operations.

The third problem is ejection stability of an ink as described below. As described above, an ink possessing both of the decomposition resistance of the compound of the general formula (I) or the compound of the general formula (II) and the sticking resistance of the ink could be provided by the constitution that the organic solvent having a small proportion $M_{OH}/M_W$ and the organic solvent having a great proportion $M_{OH}/M_W$ are used in combination. However, as a result of a further investigation, it was found that a new problem is caused when the ink is provided by the above constitution. Specifically, it was found that when the ink of the above constitution is charged into an ink jet recording apparatus, a recording head is left to stand for a short period of time during recording in a state in contact with the air, and the ink is then ejected again, the ink is not stably ejected at the beginning of ejection, and consequently dot misalignment or unevenness occurs on the resulting image. Incidentally, the ejection stability in the present invention means that when the ink is charged into the apparatus, ejection orifices of a recording head are left to stand for a short period of time during recording in a state in contact with the air, and the ink is then ejected again, the degree of dot misalignment or unevenness occurring on the resulting image at the beginning of ejection is slight.

The present inventors have considered the mechanism of this phenomenon. As a result, it has been found that the reason why the ejection stability is impaired in such a case as described above is that the following forms the cause. Water is evaporated from the ejection orifices while the ejection orifices of the recording head are left to stand in contact with the air, and the concentrations of the coloring material and the organic solvents are relatively increased in the vicinity of the ejection orifices. As a result, it has been found that the viscosity of the ink is increased, and so the ink in the vicinity of the ejection orifices becomes hard to be ejected. The present inventors have thought that the inhibition of evaporation of water from the ejection orifices is related to improvement in the ejection stability, and come up with an idea of using an organic solvent excellent in moisture retention. However, since a compound having good moisture retention, such as glycerol, generally has a hydroxyl group, the use of such a compound results in facilitation of the decomposition of the compound of the general formula (I) or the compound of the general formula (II) as described above. It is thus favorable to avoid the use of such a compound to the utmost. Therefore, the present inventors have carried out an investigation as to various compounds having good moisture retention with a view toward finding such a compound that the compound of the general formula (I) or the compound of the general formula (II) is not decomposed as much as possible. As a result, it has been found that it is only necessary to use a nitrogen-containing organic solvent which does not have a nucleophilic portion such as a hydroxyl group or has a little nucleophilic portion, which is hard to participate in the decomposition of the compound of the general formula (I) or the compound of the general formula (II), and which has excellent moisture retention, in a specific proportion which will be described subsequently. The nitrogen-containing organic solvent generally forms a hydrogen bond between the nitrogen in the compound and water when mixed with water, thereby attracting water, inhibiting release of water and consequently exhibiting moisture retention, so that such a solvent is suitable for use in the ink according to the present invention.

As the result of the above-described investigations, in order to achieve the object of the present invention to provide an ink that can solve all the three problems described above, it has been first found that it is effective that the constitution of organic solvents contained in an ink jet ink is made so as to always contain the following three organic solvents: an organic solvent for inhibiting the decomposition of the compound of the general formula (I) or the compound of the general formula (II), an organic solvent for ensuring the sticking resistance of the ink and a (nitrogen-containing) organic solvent for improving the ejection stability. It is further necessary that these three kinds of organic solvents are contained in the ink in well-balanced combination by at least one of each of them. Incidentally, the organic solvents contained in the ink in the present invention are those dissolved in water and can dissolve the coloring material in the organic solvents or in aqueous solutions thereof.

The threshold values of $M_{OH}/M_W$ of the organic solvents A, B and C making up the ink jet ink according to the present invention will now be described. The present inventors have carried out an investigation as to solubilities of the compound of the general formula (I) or the compound of the general formula (II) in various organic solvents. Specifically, 10 g of various organic solvents and 10 g of water were mixed with 10 g of an aqueous solution containing 11.0% by mass of the compound of the general formula (I) or the compound of the general formula (II), and the aqueous solution was left to stand for 7 days at room temperature on a Petri dish having a bottom area of 13 cm$^2$ to observe the condition of the aqueous solution.

As a result, it has been observed that the compound of the general formula (I) or the compound of the general formula (II) in an aqueous solution is solidified with respect to an organic solvent A having a proportion of the molecular weight of the hydroxyl group making up the organic solvent to the molecular weight of the organic solvent ($M_{OH}/M_W$) of 0 or more and less than 0.2. In other words, it has been found that the organic solvent A is low in property of stably retaining the dissolution state of the compound of the general formula (I) or the compound of the general formula (II), i.e., great in property as a poor solvent. It has also been observed that an aqueous solution containing an organic solvent B whose $M_{OH}/M_W$ is 0.2 or more and less than 0.4 becomes gelled. Further, an aqueous solution containing an organic solvent C whose $M_{OH}/M_W$ is 0.4 or more and less than 1.0 has been scarcely changed. In other words, it has been found that the organic solvent C is high in property of stably retaining the dissolution state of the compound of the general formula (I) or the compound of the general formula (II), i.e., great in property as a good solvent. From these results, the solubilities of the compound of the general formula (I) or the compound of the general formula (II) in organic solvents can be classified by the proportion $M_{OH}/M_W$ into three ranks of 0 or more and less than 0.2, 0.2 or more and less than 0.4, and 0.4 or more and less than 1.0.

On the other hand, the solubility of an organic solvent has the following relation to the decomposition resistance of the coloring material, and the sticking resistance and ejection stability that relate to the three problems in the present invention. With respect to the decomposition resistance of the coloring material, it has been already found by the investigation by the present inventors that the decomposition of the compound of the general formula (I) or the compound of the general formula (II) is more facilitated as the proportion $M_{OH}/M_W$ of an organic solvent becomes greater as described above. Accordingly, from the viewpoint of the decomposition resistance of the compound of the general formula (I) or the compound of the general formula (II), it is apparent that an organic solvent with a large proportion $M_{OH}/M_W$, i.e., greater in property as a good solvent for these compounds, is not favorable for being contained in the ink. From the viewpoints of the sticking resistance and ejection stability of the ink, an organic solvent with a small proportion $M_{OH}/M_W$, i.e., greater in property as a poor solvent, is not favorable for being contained in the ink. In other words, when such an organic solvent is contained in the ink, deposition of the coloring material in the ink and viscosity increase of the ink are caused, and consequently properties of the ink, such as sticking resistance and ejection stability, are lowered.

From these considerations, the solubility of the organic solvents contained in the ink is an important factor for providing an ink jet ink excellent in the decomposition resistance of the coloring material used in the present invention and also excellent in the sticking resistance and ejection stability of the ink. In the present invention, the solubilities of the organic solvents for the compound of the general formula (I) or the compound of the general formula (II) have thus been classified into three ranks of 0 or more and less than 0.2, 0.2 or more and less than 0.4, and 0.4 or more and less than 1.0 according to the proportion $M_{OH}/M_W$ of the organic solvents based on the above-described investigation results to define the constitution of the ink.

Incidentally, the value of $M_{OH}/M_W$ for defining an organic solvent in the present invention is rounded to one decimal. Regarding the range of $M_{OH}/M_W$, it starts from zero, which is the lower limit when the organic solvent has no hydroxyl group, and gets close to 1 when the organic solvent has more hydroxyl groups.

A feature of the present invention resides in that the kinds (more favorably contents) of the organic solvents contained in the ink are defined to solve the three problems necessarily caused by using the compound of the general formula (I) or (II) as a coloring material of the ink at the same time. Specifically, it is to provide an ink jet ink satisfying all of the decomposition resistance of the coloring material in the ink, and the sticking resistance and ejection stability of the ink. The ink jet ink according to the present invention will hereinafter be described in detail.

<Ink Jet Ink>

The components making up the ink jet ink (which hereinafter may be referred to as an ink merely) according to the present invention and physical properties of the ink will hereinafter be described in detail.

(Coloring Materials)

Compound Represented by the General Formula (I) or Compound Represented by the General Formula (II)

The ink according to the present invention requires containing, as a coloring material, a compound of the following general formula (I) having such a feature that an image excellent in fastness property and color developability can be provided. Among the compounds of the following general formula (I), a compound of the following general formula (II) is particularly favorably used. These general formulae will hereinafter be described, General formula (I)

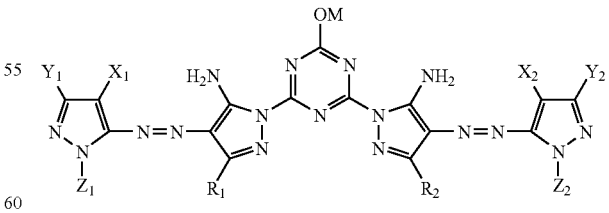

wherein $R_1$, $R_2$, $Y_1$ and $Y_2$ are, independently of one another, a monovalent group, $X_1$ and $X_2$ are, independently of each other, an electron-withdrawing group having a Hammett's σp value of 0.20 or more, $Z_1$ and $Z_2$ are, independently of each other, a hydrogen atom or a group selected from the group consisting of the following substituents: a substituted or unsubstituted alkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group, and M is a hydrogen atom, an alkali metal, an ammonium or an organic ammonium,

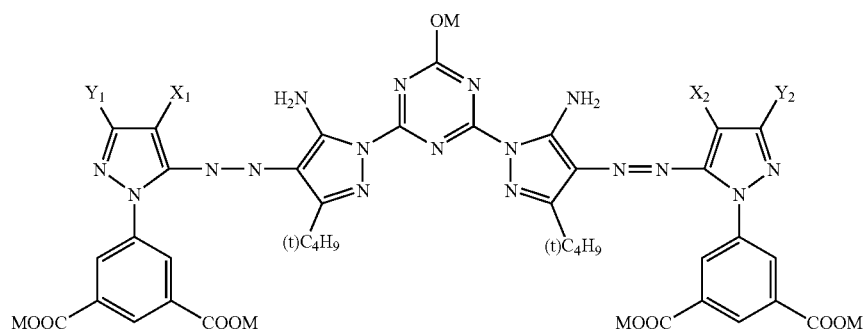

General formula (II)

wherein $X_1$ and $X_2$ are, independently of each other, an electron-withdrawing group having a Hammett's σp value of 0.20 or more, $Y_1$ and $Y_2$ are, independently of each other, a monovalent group, and M's are, independently of one another, a hydrogen atom, an alkali metal, an ammonium or an organic ammonium.

$R_1$, $R_2$, $Y_1$ and $Y_2$ in the general formula (I) and $Y_1$ and $Y_2$ in the general formula (II) are, independently of one another, a monovalent group. As specific examples of the substituent, may be mentioned a hydrogen atom, halogen atoms, and alkyl, cycloalkyl, aralkyl, alkenyl, alkynyl, aryl, heterocyclic, cyano, hydroxyl, nitro, alkoxy, aryloxy, silyloxy, heterocycleoxy, acyloxy, carbomoyloxy, alkoxycarbonyloxy, aryloxycarbonyloxy, amino (alkylamino, arylamino), acylamino (amido), aminocarbonylamino (ureido), alkoxycarbonylamino, aryloxycarbonylamino, sulfamoylamino, alkylsulfonylamino, arylsulfonylamino, alkylthio, arylthio, heterocycle-thio, sulfamoyl, alkylsulfinyl, arylsulfonyl, alkylsulfonyl, arylsulfonyl, acyl, aryloxycarbonyl, alkoxycarbonyl, carbamoyl, phosphino, phosphinyl, phosphinyloxy, phosphinylamino, silyl, azo and imido groups. These substituents may have an additional substituent(s).

Among the above-described substituents, a hydrogen atom, halogen atoms, and alkyl, aryl, heterocyclic, cyano, alkoxy, amido, ureido, alkylsulfonylamino, arylsulfonylamino, sulfamoyl, alkylsulfonyl, arylsulfonyl, carbamoyl and alkoxycarbonyl groups are favorable. Further, a hydrogen atom, halogen atoms, and alkyl, aryl, cyano, alkylsulfonyl, arylsulfonyl and heterocyclic groups are more favorable. A hydrogen atom, and alkyl, aryl, cyano and alkylsulfonyl groups are particularly favorable. In the present invention, $Y_1$ and $Y_2$ in the general formula (II) are, independently of each other, particularly favorably a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group.

Monovalent groups, which can be $R_1$, $R_2$, $Y_1$ and $Y_2$ in the general formula (I) or the general formula (II), will hereinafter be described in more detail.

Examples of the halogen atom include chlorine, bromine and iodine atoms. Among these halogen atoms, the chlorine and bromine atoms are favorable, and the chlorine atom is more favorable.

Examples of the alkyl group include substituted or unsubstituted alkyl groups having 1 to 30 carbon atoms. Specific examples thereof include methyl, ethyl, butyl, t-butyl, n-octyl, eicosyl, 2-chloroethyl, hydroxyethyl, cyanoethyl and 4-sulfobutyl groups.

Examples of the cycloalkyl group include substituted or unsubstituted cycloalkyl groups having 5 to 30 carbon atoms. Specific examples thereof include cyclohexyl, cyclopentyl and 4-n-dodecylcyclohexyl groups.

Examples of the aralkyl group include substituted or unsubstituted aralkyl groups having 7 to 30 carbon atoms. Specific examples thereof include benzyl and 2-phenethyl groups.

Examples of the alkenyl group include substituted or unsubstituted alkenyl groups having 2 to 30 carbon atoms. Specific examples thereof include vinyl, allyl, prenyl, geranyl, oleyl, 2-cyclopenten-1-yl and 2-cyclohexen-1-yl groups.

Examples of the alkynyl group include substituted or unsubstituted alkynyl groups having 2 to 30 carbon atoms. Specific examples thereof include ethynyl and propargyl groups.

Examples of the aryl group include substituted or unsubstituted aryl groups having 6 to 30 carbon atoms. Specific examples thereof include phenyl, p-tolyl, naphthyl, m-chlorophenyl and o-hexadecanoyl-aminophenyl groups.

Examples of the heterocyclic group include 5-membered and 6-membered heterocyclic groups which are monovalent groups obtained by removing one hydrogen atom from substituted or unsubstituted and aromatic or non-aromatic heterocyclic compounds. These groups may be fused with any other ring. Among these, 5-membered or 6-membered aromatic heterocyclic groups having 3 to 50 carbon atoms are favorable. Examples of the heterocyclic groups, without limiting a substitution position, include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

Examples of the alkoxy group include substituted or unsubstituted alkoxy groups having 1 to 30 carbon atoms. Specific examples thereof include methoxy, ethoxy, isopropoxy, n-octyloxy, methoxyethoxy, hydroxyethoxy and 3-carboxypropoxy groups.

Examples of the aryloxy groups include substituted or unsubstituted aryloxy groups having 6 to 30 carbon atoms.

Specific examples thereof include phenoxy, 2-methylphenoxy, 4-t-butylphenoxy, 3-nitro-phenoxy and 2-tetradecanoylaminophenoxy groups.

Examples of the silyloxy group include silyloxy groups having 3 to 20 carbon atoms. Specific examples thereof include trimethylsilyloxy and t-butyl-dimethylsilyloxy groups.

Examples of the heterocycle-oxy group include substituted or unsubstituted heterocycle-oxy groups having 2 to 30 carbon atoms. Specific examples thereof include 1-phenyltetrazole-5-oxy and 2-tetrahydro-pyranyloxy groups.

Examples of the acyloxy group include substituted or unsubstituted alkylcarbonyloxy groups having 2 to 30 carbon atoms and substituted or unsubstituted arylcarbonyloxy groups having 6 to 30 carbon atoms. Specific examples thereof include formyloxy, acetyloxy, pivaloyloxy, stearoyloxy, benzoyloxy and p-methoxyphenylcarbonyloxy groups.

Examples of the carbamoyloxy group include substituted or unsubstituted carbamoyloxy groups having 1 to 30 carbon atoms. Specific examples thereof include N,N-dimethylcarbamoyloxy, N,N-diethyl-carbamoyloxy, morpholinocarbonyloxy, N,N-di-n-octylaminocarbonyloxy and N-n-octylcarbamoyloxy groups.

Examples of the alkoxycarbonyloxy group include substituted or unsubstituted alkoxycarbonyloxy groups having 2 to 30 carbon atoms. Specific examples thereof include methoxycarbonyloxy, ethoxycarbonyloxy, t-butoxycarbonyloxy and n-octyloxycarbonyloxy groups.

Examples of the aryloxycarbonyloxy group include substituted or unsubstituted aryloxycarbonyloxy groups having 7 to 30 carbon atoms. Specific examples thereof include phenoxycarbonyloxy, p-methoxyphenoxy-carbonyloxy and p-n-hexadecyloxyphenoxycarbonyloxy groups.

Examples of the amino group include substituted or unsubstituted alkylamino groups having 1 to 30 carbon atoms and substituted or unsubstituted arylamino groups having 6 to 30 carbon atoms. Specific examples thereof include amino, methylamino, dimethyl-amino, anilino, N-methylanilino, diphenylamino, hydroxyethylamino, carboxyethylamino, sulfoethylamino and 3,5-dicarboxyanilino groups.

Examples of the acylamino group include a formylamino group, substituted or unsubstituted alkylcarbonylamino groups having 1 to 30 carbon atoms and substituted or unsubstituted arylcarbonylamino groups having 6 to 30 carbon atoms. Specific examples thereof include formylamino, acetylamino, pivaloylamino, lauroylamino, benzoylamino and 3,4,5-tri-n-octyloxy-phenylcarbonylamino groups.

Examples of the aminocarbonylamino group include substituted or unsubstituted aminocarbonylamino groups having 1 to 30 carbon atoms. Specific examples thereof include carbamoylamino, N,N-dimethylamino-carbonylamino, N,N-diethylaminocarbonylamino and morpholinocarbonylamino groups.

Examples of the alkoxycarbonylamino group include substituted or unsubstituted alkoxy-carbonylamino groups having 2 to 30 carbon atoms. Specific examples thereof include methoxycarbonylamino, ethoxycarbonylamino, t-butoxycarbonylamino, n-octadecyloxycarbonylamino and N-methylmethoxycarbonyl-amino groups.

Examples of the aryloxycarbonylamino group include substituted or unsubstituted aryloxy-carbonylamino groups having 7 to 30 carbon atoms. Specific examples thereof include phenoxycarbonylamino, p-chlorophenoxycarbonylamino and m-n-octyloxyphenoxy-carbonylamino groups.

Examples of the sulfamoylamino group include substituted or unsubstituted sulfamoylamino groups having 0 to 30 carbon atoms. Specific examples thereof include sulfamoylamino, N,N-dimethylaminosulfonylamino and N-n-octylaminosulfonylamino groups.

Examples of the alkylsulfonylamino group and arylsulfonylamino group include substituted or unsubstituted alkylsulfonylamino groups having 1 to 30 carbon atoms and substituted or unsubstituted arylsulfonylamino groups having 6 to 30 carbon atoms. Specific examples thereof include methylsulfonylamino, butylsulfonylamino, phenylsulfonylamino, 2,3,5-trichlorophenylsulfonylamino and p-methylphenylsulfonylamino groups.

Examples of the alkylthio group include substituted or unsubstituted alkylthio groups having 1 to 30 carbon atoms. Specific examples thereof include methylthio, ethylthio and n-hexylthio group.

Examples of the arylthio group include substituted or unsubstituted arylthio groups having 6 to 30 carbon atoms. Specific examples thereof include phenylthio, p-chlorophenylthio and m-methoxyphenylthio groups.

Examples of the heterocycle-thio group include substituted or unsubstituted heterocycle-thio groups having 2 to 30 carbon atoms. Specific examples thereof include 2-benzothiazolylthio and 1-phenyltetrazol-5-yl-thio groups.

Examples of the sulfamoyl group include substituted or unsubstituted sulfamoyl groups having 0 to 30 carbon atoms. Specific examples thereof include N-ethylsulfamoyl, N-(3-dodecyloxypropyl)sulfamoyl, N,N-dimethylsulfamoyl, N-acetylsulfamoyl, N-benzoyl-sulfamoyl and N—(N'-phenylcarbamoyl)sulfamoyl groups.

Examples of the alkylsulfinyl group and arylsulfinyl group include substituted or unsubstituted alkylsulfinyl groups having 1 to 30 carbon atoms and substituted or unsubstituted arylsulfinyl groups having 6 to 30 carbon atoms. Specific examples thereof include methylsulfinyl, ethylsulfinyl, phenylsulfinyl and p-methylphenylsulfinyl groups.

Examples of the alkylsulfonyl group and arylsulfonyl group include substituted or unsubstituted alkylsulfonyl groups having 1 to 30 carbon atoms and substituted or unsubstituted arylsulfonyl groups having 6 to 30 carbon atoms. Specific examples thereof include methylsulfonyl, ethylsulfonyl, phenylsulfonyl and p-toluenesulfonyl groups.

Examples of the acyl group include the following groups: a formyl group, substituted or unsubstituted alkylcarbonyl groups having 2 to 30 carbon atoms, substituted or unsubstituted arylcarbonyl groups having 7 to 30 carbon atoms, and substituted or unsubstituted heterocyclic carbonyl groups having 4 to 30 carbon atoms in which the carbonyl group is bonded through a carbon atom. Specific examples thereof include acetyl, pivaloyl, 2-chloroacetyl, stearoyl, benzoyl, p-n-octyloxyphenylcarbonyl, 2-pyridylcarbonyl and 2-furylcarbonyl groups.

Examples of the aryloxycarbonyl group include substituted or unsubstituted aryloxycarbonyl groups having 7 to 30 carbon atoms. Specific examples thereof include phenoxycarbonyl, o-chlorophenoxycarbonyl, m-nitrophenoxycarbonyl and p-t-butylphenoxycarbonyl groups.

Examples of the alkoxycarbonyl group include substituted or unsubstituted alkoxycarbonyl groups having 2 to 30 carbon atoms. Specific examples thereof include methoxycarbonyl, ethoxycarbonyl, t-butoxy-carbonyl and n-octadecyloxycarbonyl groups.

Examples of the carbamoyl group include substituted or unsubstituted carbamoyl groups having 1 to 30 carbon atoms. Specific examples thereof include carbamoyl, N-methylcarbamoyl, N,N-dimethylcarbamoyl, N,N-di-n-octyl-carbamoyl and N-(methylsulfonyl)-carbamoyl groups.

Examples of the phosphino group include substituted or unsubstituted phosphino groups having 2 to 30 carbon atoms. Specific examples thereof include dimethylphosphino, diphenylphosphino and methylphenoxy-phosphino groups.

Examples of the phosphinyl group include substituted or unsubstituted phosphinyl groups having 2 to 30 carbon atoms. Specific examples thereof include phosphinyl, dioctyloxyphosphinyl and diethoxyphosphinyl groups.

Examples of the phosphinyloxy group include substituted or unsubstituted phosphinyloxy groups having 2 to 30 carbon atoms. Specific examples thereof include diphenoxyphosphinyloxy and dioctyloxy-phosphinyloxy groups.

Examples of the phosphinylamino group include substituted or unsubstituted phosphinylamino groups having 2 to 30 carbon atoms. Specific examples thereof include dimethoxyphosphinylamino and dimethylamino-phosphinylamino groups.

Examples of the silyl group include substituted or unsubstituted silyl groups having 3 to 30 carbon atoms. Specific examples thereof include trimethylsilyl, t-butyldimethylsilyl and phenyl-dimethylsilyl groups.

Specific examples of the azo group include phenylazo, 4-methoxyphenylazo, 4-pivaloylaminophenylazo and 2-hydroxy-4-propanoylphenylazo groups.

Specific examples of the imido group include N-succinimido and N-phthalimido groups.

These substituents may be further substituted. In this case, examples of substituents include the following substituents: linear or branched alkyl groups having 1 to 12 carbon atoms, linear or branched aralkyl groups having 7 to 18 carbon atoms, linear or branched alkenyl groups having 2 to 12 carbon atoms, linear or branched alkynyl groups having 2 to 12 carbon atoms, linear or branched cycloalkyl groups having 3 to 12 carbon atoms and linear or branched cycloalkenyl groups having 3 to 12 carbon atoms. These substituents favorably have a branched chain for making the solubility of a dye and the stability of the resulting ink excellent, and particularly favorably have an asymmetric carbon.

Specific examples of the substituents include the following respective groups: substituted or unsubstituted alkyl groups such as methyl, ethyl, propyl, isopropyl, sec-butyl, t-butyl, 2-ethylhexyl, 2-methylsulfonylethyl, 3-phenoxypropyl, trifluoromethyl and cyclopentyl; halogen atoms such as chlorine and bromine atoms; aryl groups such as phenyl, 4-t-butylphenyl and 2,4-di-t-amylphenyl; heterocyclic groups such as imidazolyl, pyrazolyl, triazolyl, 2-furyl, 2-thienyl, 2-pyrimidinyl and 2-benzothiazolyl; a cyano group; a hydroxyl group; a nitro group; a carboxyl group; an amino group; alkyloxy groups such as methoxy, ethoxy, 2-methoxyethoxy and 2-methylsulfonylethoxy; aryloxy groups such as phenoxy, 2-methylphenoxy, 4-t-butylphenoxy, 3-nitrophenoxy, 3-t-butyloxycarbonyl-phenoxy and 3-methoxycarbonylphenoxy; acylamino groups such as acetamido, benzamido and 4-(3-t-butyl-4-hydroxyphenoxy)butanamido; alkylamino groups such as methylamino, butylamino, diethylamino and methylbutylamino; anilino groups such as phenylamino and 2-chloroanilino; ureido groups such as phenylureido, methylureido and N,N-dibutylureido; sulfamoylamino groups such as N,N-dipropylsulfamoylamino; alkylthio groups such as methylthio, octylthio and 2-phenoxy-ethylthio; arylthio groups such as phenyl thio, 2-butoxy-5-t-octylphenylthio and 2-carboxyphenylthio; alkyloxycarbonylamino groups such as methoxycarbonyl-amino; alkyl- or arylsulfonylamino groups such as methylsulfonylamino, phenylsulfonylamino and p-toluenesulfonylamino; carbamoyl groups such as N-ethyl-carbamoyl, N,N-dibutylcarbamoyl; sulfamoyl groups such as N-ethylsulfamoyl, N,N-dipropylsulfamoyl and N-phenylsulfamoyl; sulfonyl groups such as methylsulfonyl, octylsulfonyl, phenylsulfonyl and p-toluenesulfonyl; alkyloxycarbonyl groups such as methoxycarbonyl and butyloxycarbonyl; heterocycle-oxy groups such as 1-phenyltetrazole-5-oxy and 2-tetrahydropyranyloxy; azo groups such as phenylazo, 4-methoxyphenylazo, 4-pivaloylaminophenylazo and 2-hydroxy-4-propanoylphenyl-azo; acyloxy groups such as acetoxy; carbamoyloxy groups such as N-methylcarbamoyloxy and N-phenyl-carbamoyloxy; silyloxy groups such a trimethylsilyloxy and dibutylmethylsilyloxy; aryloxycarbonylamino groups such as phenoxycarbonylamino; imido groups such a N-succinimido and N-phthalimido; heterocycle-thio groups such as 2-benzothiazolylthio, 2,4-diphenoxy-1,3,5-triazole-6-thio and 2-pyridylthio; sulfinyl groups such as 3-phenoxypropylsulfinyl; phosphonyl groups such as phenoxyphosphonyl, octyloxyphosphonyl and phenyl-phosphonyl; aryloxycarbonyl groups such as phenoxycarbonyl; acyl groups such as acetyl, 3-phenyl-propanoyl and benzoyl; and ionic hydrophilic groups such as carboxyl, sulfonic, phosphono and quaternary ammonium groups.

$X_1$ and $X_2$ in the general formula (I) or the general formula (II) are electron-withdrawing groups having a Hammett's σp value of 0.20 or more. Such a substituent will hereinafter be described.

Here, Hammett's rule and Hammett's substituent constant, σp value (hereinafter referred to as "Hammett's σp value") are described. The Hammett's rule is an empirical rule proposed by L. P. Hammett in 1935 for quantitatively discussing the influence of a substituent on a reaction and equilibrium of a benzene derivative, and the appropriateness thereof is widely recognized nowadays. The σp value and the σm value in the substituent constants determined by the Hammett's rule, and these values are described in many books and described in detail in, for example, Lange's Handbook of Chemistry, twelfth edition edited by J. A. Dean, 1979, McGraw-Hill and *KAGAKU NO RYOIKI* (Chemical Regions), extra edition, No. 122, pp. 96 to 103, 1979, Nankodo.

Incidentally, in the present invention, the respective substituents of $X_1$ and $X_2$ in the general formula (I) or the general formula (II) are defined by the Hammett's σp values. However, the present invention is not limited to only the substituents whose σp values are specifically described in such papers as described above. Needless to say, the present invention also includes substituents whose σp values are not specifically described in such papers as described above and which would be included in the scope of the present invention when their σp values are calculated out based on the Hammett's rule. Neither the compound of the general formula (I) nor the compound of the general formula (II) is a benzene derivative. In the present invention, however, the σp value is used irrespective of substitution position as a measure indicating the electron effect of the substituent. Specific examples of substituents which can be used as electron-withdrawing groups having a Hammett's σp value of 0.20 or more for the substituents of the compound of the general formula (I) or the compound of the general formula (II) are mentioned below at according to range of the Hammett's σp value.

Examples of electron-withdrawing groups having a Hammett's σp value of 0.60 or more include the following groups: Cyano, nitro, alkylsulfonyl (for example, methane-sulfonyl) and arylsulfonyl (for example, benzene-sulfonyl) groups.

Examples of electron-withdrawing groups having a Hammett's σp value of 0.45 or more include, in addition to the above-described groups, the following groups: Acyl (for example, acetyl), alkoxycarbonyl (for example, dodecyloxycarbonyl), aryloxycarbonyl (for example, m-chlorophenoxycarbonyl), alkylsulfinyl (for example, n-propylsulfinyl), arylsulfonyl (for example, phenylsulfinyl), sulfamoyl (for example, N-ethylsulfamoyl, N,N-dimethylsulfamoyl) and halogenated alkyl (for example, trifluoromethyl) groups.

Examples of electron-withdrawing groups having a Hammett's σp value of 0.30 or more include, in addition to the above-described groups, the following groups: Acyloxy (for example, acetoxy), carbamoyl (for example, N-ethylcarbamoyl, N,N-dibutylcarbamoyl), halogenated alkoxy (for example, trifluoromethyloxy), halogenated aryloxy (for example, pentafluorophenyloxy), sulfonyloxy (for example, methylsulfonyloxy) and halogenated alkylthio (for example, difluoromethylthio) groups, aryl groups (for example, 2,4-dinitrophenyl, pentachlorophenyl) substituted with 2 or more electron-withdrawing groups having a σp value of 0.15 or more, and heterocyclic groups (for example, 2-benzoxazolyl, 2-benzothiazolyl, 1-phenyl-2-benzimidazolyl).

Examples of electron-withdrawing groups having a Hammett's σp value of 0.20 or more include halogen atoms (for example, fluorine, chlorine and bromine) in addition to the above-described groups.

$Z_1$ and $Z_2$ in the general formula (I) are, independently of each other, any of the following substituents: a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group. Examples of the alkyl group include the same groups as the alkyl groups mentioned in the description of $R_1$, $R_2$, $Y_1$ and $Y_2$ previously. Examples of the alkenyl group include the same groups as the alkenyl groups mentioned in the description of $R_1$, $R_2$, $Y_1$ and $Y_2$ previously. Examples of the alkynyl group include the same groups as the alkynyl groups mentioned in the description of $R_1$, $R_2$, $Y_1$ and $Y_2$ previously. Examples of the aralkyl group include the same groups as the aralkyl groups mentioned in the description of $R_1$, $R_2$, $Y_1$ and $Y_2$ previously. Examples of the aryl group include the same groups as the aryl groups mentioned in the description of $R_1$, $R_2$, $Y_1$ and $Y_2$ previously. Examples of the heterocyclic group include the same groups as the heterocyclic groups mentioned in the description of $R_1$, $R_2$, $Y_1$ and $Y_2$ previously. These substituents may be further substituted. In this case, examples of substituents include the same groups as those mentioned as the groups further substituting the substituents mentioned in the description of $R_1$, $R_2$, $Y_1$ and $Y_2$ previously.

M's in the general formula (I) and the general formula (II) are, independently of one another, a hydrogen atom, an alkali metal, an ammonium or an organic ammonium. Examples of the alkali metal include lithium, sodium and potassium. Examples of the organic ammonium include acetamido, benzamido, methylamino, butylamino, diethylamino and phenylamino.

Specific favorable examples of the compound of the general formula (I) or the compound of the general formula (II) include the following Exemplified Compounds 1 to 14. Incidentally, the following Exemplified Compounds are described in the form of a free acid. Needless to say, the compounds in the present invention are not limited to the following Exemplified Compounds so far as the compounds are embraced in the structure of the compound of the general formula (I) or the compound of the general formula (II) and the definition thereof. Among the following Exemplified Compounds, Exemplified Compounds 5, 6, 7, 8 and 10 are particularly favorably used in the present invention.

Exemplified compound (1)

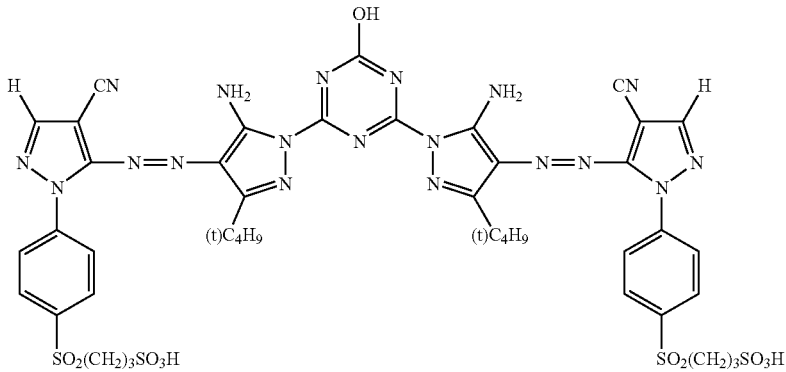

Exemplified compound (2)

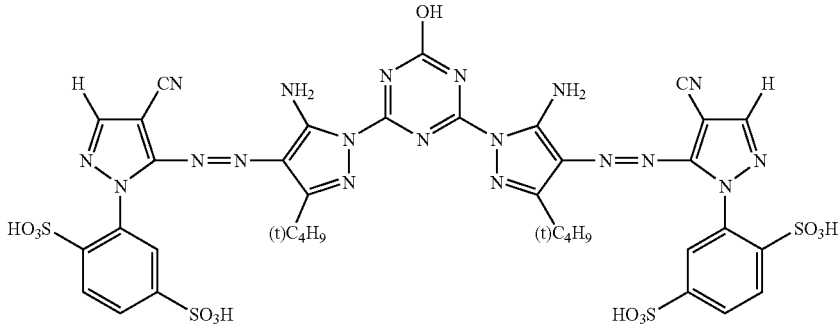

Exemplified compound (3)
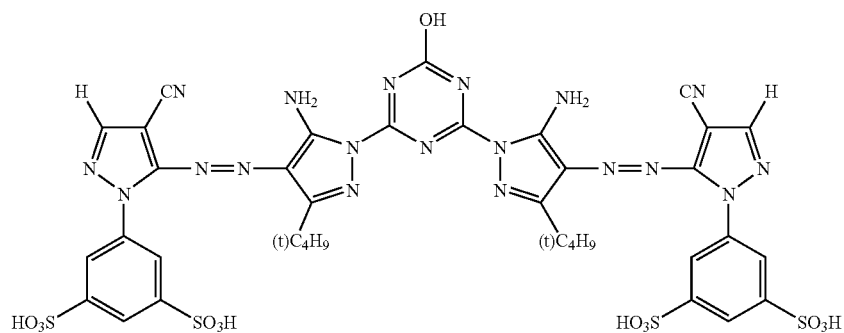
Exemplified compound (4)
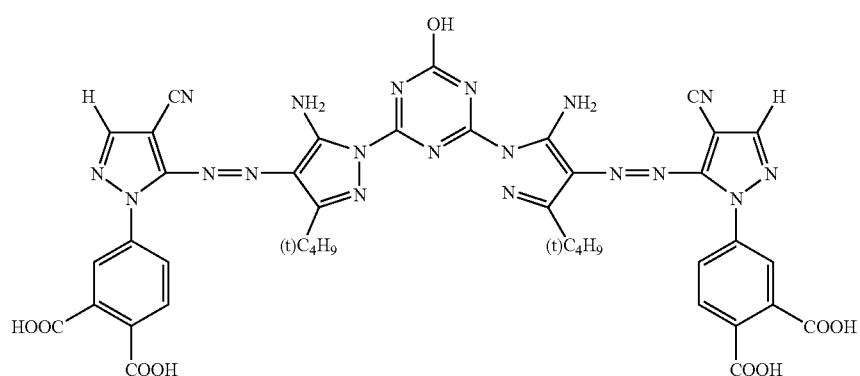
Exemplified compound (5)
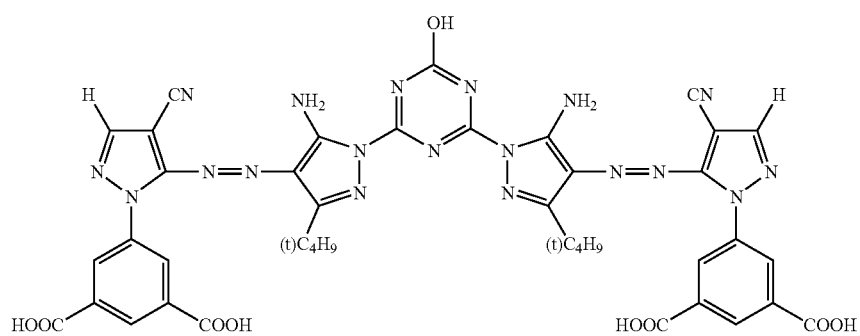
Exemplified compound (6)
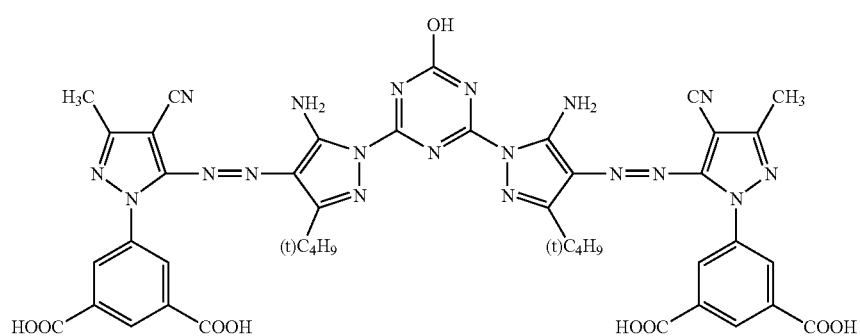

Exemplified compound (7)
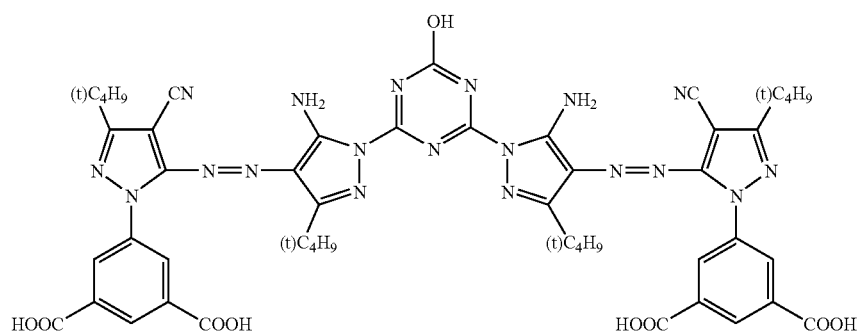
Exemplified compound (8)
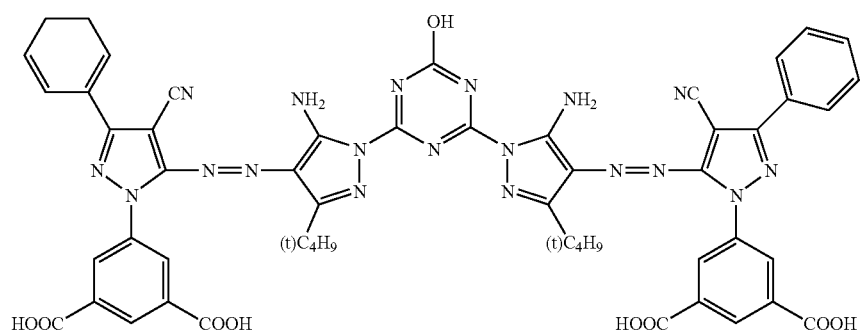
Exemplified compound (9)
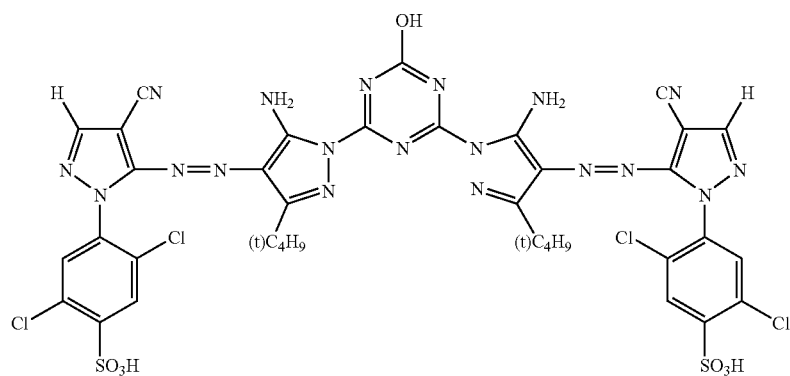
Exemplified compound (10)
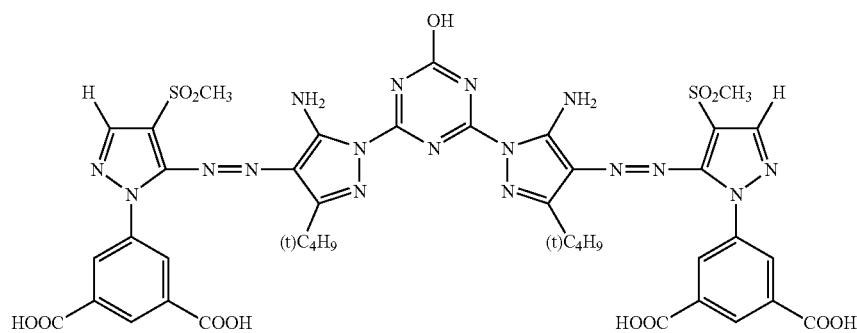

Exemplified compound (11)

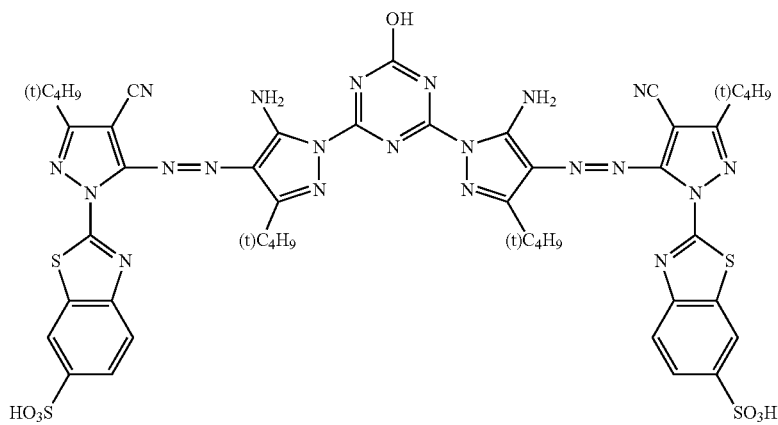

Exemplified compound (12)

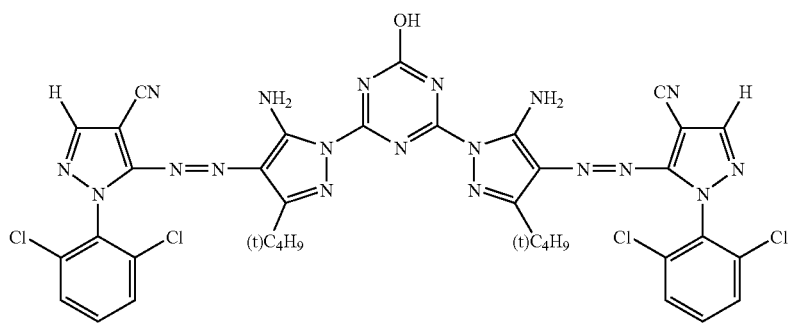

Exemplified compound (13)

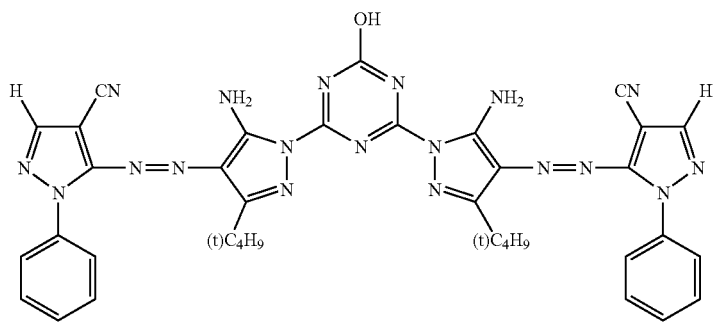

Exemplified compound (14)

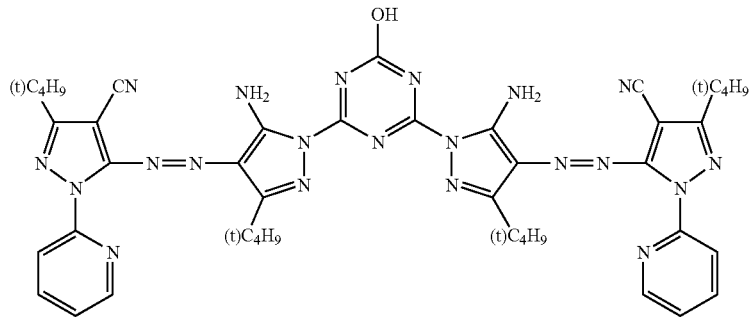

Consideration on Decomposition Tendency of Compound of General Formula (I) or Compound of General Formula (II)

The present inventors used the following method to verify that the compound of the general formula (I) or the compound of the general formula (II) having such a structure as described above varies the decomposition tendency thereof according to the kind of an organic solvent used in combination with the compound (coloring material). Here, description is given by taking Exemplified Compound 5 described above as an example of the compound of the general formula (I) or the compound of the general formula (II). First, Exemplified Compound 5 (3.0% by mass) was mixed with each (25.0% by mass) of the organic solvents shown in the following Table 1 and water (72.0% by mass) to prepare Inks 1 to 5. The respective inks thus obtained were respectively stored for 7 days under conditions of a temperature of 70° C. to determine peaks of the coloring material by means of high-performance liquid chromatography (HPLC) as to the inks before and after the storage. The rate of decrease of the peak area of the coloring material in each ink before and after the storage was regarded as the decomposition rate of the coloring material. The kinds of the organic solvents used in the respective inks and the decomposition rates of the Exemplified Compound 5 found by the above-described method are shown in Table 1. The relation between the proportion $M_{OH}/M_W$ of the organic solvents and the decomposition rate of the compound of the general formula (I) is diagrammatically illustrated in FIG. 1. From FIG. 1, good correlation was found between the $M_{OH}/M_W$ value and the decomposition rate of the compound of the general formula (I), and it was understood that the decomposition rate becomes high with increasing $M_{OH}/M_W$. The same experiment was conducted on C.I. Direct Yellow 86 that is a general disazo yellow dye having a triazine ring like the compound of the general formula (I) or the compound of the general formula (II). However, the decomposition of the dye did not occur.

TABLE 1

Results of confirmation test on differences in decomposition tendency of Exemplified Compound 5 according to kinds of organic solvents

| Ink | Kind of organic solvent | $M_{OH}/M_W$ | Classification | Decomposition rate (%) |
|---|---|---|---|---|
| 1 | Glycerol | 0.55 | C | 28.7 |
| 2 | Triethylene glycol | 0.23 | B | 11.9 |
| 3 | Triethylene glycol monobutyl ether | 0.08 | A | 5.0 |
| 4 | Polyethylene glycol (*1) | 0.17 | A | 9.9 |
| 5 | Trimethylolpropane | 0.38 | B | 20.2 |

(*1) average molecular weight: 200

Content of Coloring Material

The content (% by mass) of the coloring material (compound of the general formula (I) or compound of the general formula (II)) in the ink is favorably 1.0% by mass or more and 10.0% by mass or less based on the total mass of the ink. If the content of the coloring material is less than 1.0% by mass, the fastness property and color developability of the resulting image may not be sufficiently achieved in some cases. If the content exceeds 10.0% by mass, ink jet characteristics such as sticking resistance may not be achieved in some cases.

(pH of Ink)

The ink according to the present invention favorably has a pH of 7.0 or more and 10.0 or less. If the pH of the ink exceeds 10.0, materials forming members coming into contact with the ink in an ink cartridge or ink jet recording apparatus may cause the following problems according to the kinds thereof in some cases. Namely, impurities may be dissolved out in the ink to lower the performance of the ink in some cases. In addition, the materials forming the members coming into contact with the ink may be deteriorated in some cases. Further, deterioration (dissolution) of a liquid-contacting face of a heat-generating portion in a recording head, or breaking of a wiring may be caused in some cases when recording is conducted continuously for a long period of time. If the pH of the ink is less than 7.0 on the other hand, the solubility of the compound of the general formula (I) or the compound of the general formula (II) is lowered, so that the storage stability of the ink may be lowered in some cases.

(Aqueous Medium)

An aqueous solvent that is a mixed solvent of water and water-soluble organic solvents may be used in the ink according to the present invention. The kinds and contents of the organic solvents contained in the ink according to the present invention need to be suitably selected in view of the decomposition resistance of the compound of the general formula (I) or the compound of the general formula (II) as well as the sticking resistance and ejection stability of the ink. Specifically, three organic solvents of an organic solvent A having a proportion of the molecular weight of hydroxyl group to the molecular weight of the organic solvent ($M_{OH}/M_W$) of 0 or more and less than 0.2, an organic solvent B having a proportion ($M_{OH}/M_W$) of 0.2 or more and less than 0.4, and an organic solvent C having a proportion ($M_{OH}/M_W$) of 0.4 or more and less than 1.0 need to be contained in the ink. In other words, the ink according to the present invention requires containing at least one of each of the organic solvents A, B and C. Incidentally, organic solvents in the present invention can dissolve in water and can dissolve a coloring material in the organic solvent or in an aqueous solution thereof. The total content (% by mass) of the organic solvents in the ink is favorably 5.0% by mass or more and 90.0% by mass or less, more favorably 5.0% by mass or more and 50.0% by mass or less, based on the total mass of the ink. Deionized water (ion-exchanged water) is favorably used as the water. The content (% by mass) of water in the ink is favorably 50.0% by mass or more and 90.0% by mass or less based on the total mass of the ink.

(Organic Solvent A)

An organic solvent classified as the organic solvent A used in the present invention is such a compound that the proportion of the molecular weight of the hydroxyl group portion to the molecular weight of the organic solvent ($M_{OH}/M_W$) is 0 or more and less than 0.2. The ink according to the present invention requires containing at least one of such organic solvents. In addition, the ink according to the present invention requires that 80.0% or more of the organic solvent classified as the organic solvent A is a nitrogen-containing organic solvent. The nitrogen-containing organic solvent is excellent in moisture retention and thus has a property of absorbing water or making water hard to be released when coexisting with water. The content (% by mass) of the organic solvent A in the ink is favorably 3.0% by mass or more and 12.0% by mass or less, more favorably 4.0% by mass or more and 11.0% by mass or less, based on the total mass of the ink. If the content is less than 3.0% by mass, the effect to improve the ejection stability may not be sufficiently achieved in some cases. If the content exceeds 12.0% by mass on the other hand, the viscosity of the resulting ink becomes high, whereby ejection failure may occur, and consequently the effect to improve the ejection stability may not be sufficiently achieved in some cases. When two or more organic solvents corresponding to the organic solvent A are used, it is necessary that 80.0% by mass or more thereof are nitrogen-containing organic solvents. The reason for this is that when the content of the nitrogen-containing organic solvents in the organic solvent A is less than 80.0% by mass, the effect to improve the ejection stability becomes insufficient. Incidentally, the present invention requires satisfying the condition that 80.0% or more of the organic solvents corresponding to the organic solvent A are nitrogen-containing organic solvents, so that it is necessary that when the ink contains only one organic solvent A, said organic solvent A is a nitrogen-containing organic solvent.

Specific examples of organic solvents A usable in the present invention include the following organic solvents: diethylene glycol monobutyl ether, triethylene glycol monobutyl ether, tripropylene glycol, polyethylene glycol having an average molecular weight of the order of from 200 to 1,000, specifically, 200, 400, 600 or 1,000, and nitrogen-containing organic solvents. Needless to say, the organic solvents A in the present invention are not limited to the above-described compounds so far as they are embraced in the definition of the organic solvent A. It is necessary for at least one of these organic solvents A to be contained in the ink according to the present invention. However, two or more thereof may be contained.

In order to give excellent moisture retention, the nitrogen-containing organic solvent is favorably a compound selected from urea, urea derivatives and pyrrolidones. In the present invention, a compound represented by the following general formula (III) is particularly favorably used. The reason why such a cyclic nitrogen-containing organic solvent is favorable is that the pH of the resulting ink is not changed even when the ink is stored. A cyclic nitrogen-containing organic solvents such as urea may be decomposed during storage of the ink in some cases to cause a problem of increase of the pH of the ink. However, the cyclic nitrogen-containing organic solvent is hard to be decomposed. When the pH of the ink is increased, the decomposition or precipitation of the compound of the general formula (I) or the compound of the general formula (II) may be caused in some cases. Specific examples of the cyclic nitrogen-containing organic solvent include 2-pyrrolidone, N-methyl-2-pyrrolidone, ethylene urea and N,N'-dimethylethylene urea. In the present invention, the nitrogen-containing organic solvent alone is particularly favorably used as the organic solvent classified as the organic solvent A,

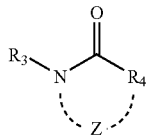

General formula (III)

wherein $R_3$ is a hydrogen atom, an alkyl group, a cycloalkyl group, an aralkyl group, an aryl group or an acyl group, $R_4$ is N—$R_5$ or $CH_2$ ($R_5$ being a hydrogen atom or an alkyl group), and Z is an atomic group forming a monocyclic or polycyclic ring structure together with a urea group or a substituted or unsubstituted amide group in the general formula (III).

The respective substituents in the general formula (III) are favorably the following substituents. The alkyl group is an alkyl group having 1 to 10 carbon atoms. The cycloalkyl group is a cycloalkyl group having 3 to 10 carbon atoms. The aralkyl group is an aralkyl group having 7 to 10 carbon atoms. The aryl group is an aryl group having 6 to 10 carbon atom. The acyl group is a formyl group, an alkylcarbonyl group having 2 to 10 carbon atoms, an arylcarbonyl group having 7 to 10 carbon atoms, or a heterocyclic carbonyl group having 4 to 10 carbon atoms in which the carbonyl group is bonded through a carbon atom. All these groups may be substituted or unsubstituted. Z is favorably an ethylene group.

(Organic Solvent B)

An organic solvent classified as the organic solvent B used in the present invention is such a compound that the proportion of the molecular weight of the hydroxyl group portion to the molecular weight of the compound ($M_{OH}/M_W$) is 0.2 or more and less than 0.4. The content (% by mass) of the organic solvent B in the ink is favorably 3.0% by mass or more and 15.0% by mass or less, more favorably 4.0% by mass or more and 14.0% by mass or less, based on the total mass of the ink. If the content of the organic solvent B is less than 3.0% by mass, the reliability of the ink, such as sticking resistance, may not be achieved in some cases. If the content of the organic solvent B in the ink exceeds 15.0% by mass on the other hand, the viscosity of the ink is increased, whereby ejection failure may occur, and consequently the effect to improve the ejection stability may not be sufficiently achieved in some cases. Specific examples of organic solvents B usable in the present invention include the following organic solvents: diethylene glycol, triethylene glycol, 3-methoxy-1,2-propanediol, 2-methyl-1,3-propanediol, 3-methyl-1,5-pentanediol, dipropylene glycol, 1,4-butanediol, 1,5-pentanediol, 1,2,6-hexanetriol, trimethylolpropane, bis(2-hydroxyethyl) sulfone and triethanolamine. Needless to say, the organic solvents B in the present invention are not limited to the above-described compounds so far as they are embraced in the definition of the organic solvent B. It is necessary for at least one of these organic solvents B to be contained in the ink according to the present invention. However, two or more thereof may be contained.

(Organic Solvent C)

An organic solvent classified as the organic solvent C used in the present invention is such a compound that the proportion of the molecular weight of the hydroxyl to the molecular weight of the organic solvent ($M_{OH}/M_W$) is 0.4 or more and less than 1.0. The content (% by mass) of the organic solvent C in the ink is favorably 2.0% by mass or more and 12.0% by mass or less, more favorably 3.0% by mass or more and 11.0% by mass or less, based on the total mass of the ink. If the content of the organic solvent C is less than 2.0% by mass, the reliability of the ink, such as sticking resistance, may not be achieved in some cases. If the content of the organic solvent C exceeds 12.0% by mass on the other hand, the decomposition resistance of the compound of the general formula (I) may be lowered in some cases.

The content of the organic solvent C in the ink is favorably the same or lower than the content of the organic solvent B. If the content of the organic solvent C is higher than the content of the organic solvent B, it may be difficult in some cases to achieve both the decomposition resistance and the sticking resistance. Specific examples of the organic solvent C include glycerol, diglycerol, ethylene glycol and 1,2-propanediol. Needless to say, the organic solvents C in the present invention are not limited to the above-described compounds so far as they are embraced in the definition of the organic solvent C. It is necessary for at least one of these organic solvents C to be contained in the ink according to the present invention. However, two or more thereof may be contained.

(Surfactant)

The ink according to the present invention favorably contains a surfactant in addition to the above-described components. The content (% by mass) of the surfactant in the ink is favorably less than 2.0% by mass based on the total mass of the ink. If the content of the surfactant exceeds the above range, the ejection stability may not be sufficiently achieved in some cases when the ink is used in an ink jet recording apparatus. The lower limit of the content (% by mass) of the surfactant in the ink favorably exceeds 0.0% by mass based on the total mass of the ink and is more favorably 0.1% by mass or more. Examples of the surfactant include nonionic surfactants, cationic surfactants and anionic surfactants. In the ink according to the present invention, a nonionic surfactant is favorably used, and an acetylene glycol type surfactant is particularly favorably used. Examples of the acetylene glycol type surfactant include Acetylenol EH and E100 (both, products of Kawaken Fine Chemicals Co., Ltd.), and SURFYNOL 104, 82 and 465, and OLFIN STG (all, products of NISSIN CHEMICAL INDUSTRY CO., LTD.). Incidentally, in the present invention, the surfactants are not included in the organic solvents.

(Other Additives)

The ink according to the present invention may contain various additives such as pH adjustors, rust preventives, preservatives, mildewproofing agents, antioxidants, anti-reducing agents, evaporation accelerators, chelating agents and water-soluble polymers in addition to the above-described components as needed. Incidentally, in the present invention, the additives are not included in the organic solvents.

(Other Inks)

The ink according to the present invention is favorably used in an ink jet recording method, and the ink according to the present invention may be used in combination with inks having other color tones than the ink according to the present invention for forming a full-color image. The ink according to the present invention is favorably used in combination with at least one ink selected from, for example, black, cyan, magenta, yellow, red, green and blue inks. The so-called light color inks having substantially the same color tones as these inks may also be further used in combination. Coloring materials used in these inks or light color inks may be publicly known dyes or newly synthesized coloring materials.

<Ink Jet Recording Method>

The ink according to the present invention is particularly favorably used in the ink jet recording method according to the present invention, in which the ink is ejected by an ink jet system to conduct recording on a recording medium. Examples of the ink jet recording method include a recording method in which mechanical energy is applied to an ink to eject the ink, and a recording method in which thermal energy is applied to an ink to eject the ink. The ink according to the present invention can be applied to both recording methods. In the ink jet recording method according to the present invention, the ink jet recording method utilizing thermal energy is particularly favorably used.

<Ink Cartridge>

The ink cartridge according to the present invention is equipped with an ink storage portion storing the ink according to the present invention.

<Recording Unit>

The recording unit according to the present invention is equipped with an ink storage portion storing the ink according to the present invention and a recording head for ejecting the ink. Such a recording unit that the recording head ejects an ink by applying thermal energy corresponding to a recording signal to the ink is a particularly favorable mode. The recording unit according to the present invention is particularly favorably equipped with a recording head having a liquid-contacting face of a heat-generating portion containing a metal and/or a metal oxide. Specific examples of the metal and/or the metal oxide making up the liquid-contacting face of the heat-generating portion include metals such as Ta, Zr, Ti, Ni and Al, and oxides of these metals.

<Ink Jet Recording Apparatus>

The ink jet recording apparatus according to the present invention is equipped with an ink storage portion storing the ink according to the present invention and a recording head for ejecting the ink. An ink jet recording apparatus of such a system that the ink is ejected by applying thermal energy corresponding to a recording signal to the ink in the interior of the recording head having the ink storage portion storing the ink is mentioned as a favorable mode.

The schematic construction of a mechanism portion of an exemplary ink jet recording apparatus according to the present invention will hereinafter be described. The ink jet recording apparatus is constructed by a paper feeding portion, a conveying portion, a carriage portion, a paper discharging portion, a cleaning portion and an outer casing portion for protecting these portions and imparting design in terms of role of the respective mechanisms.

Figure 2:
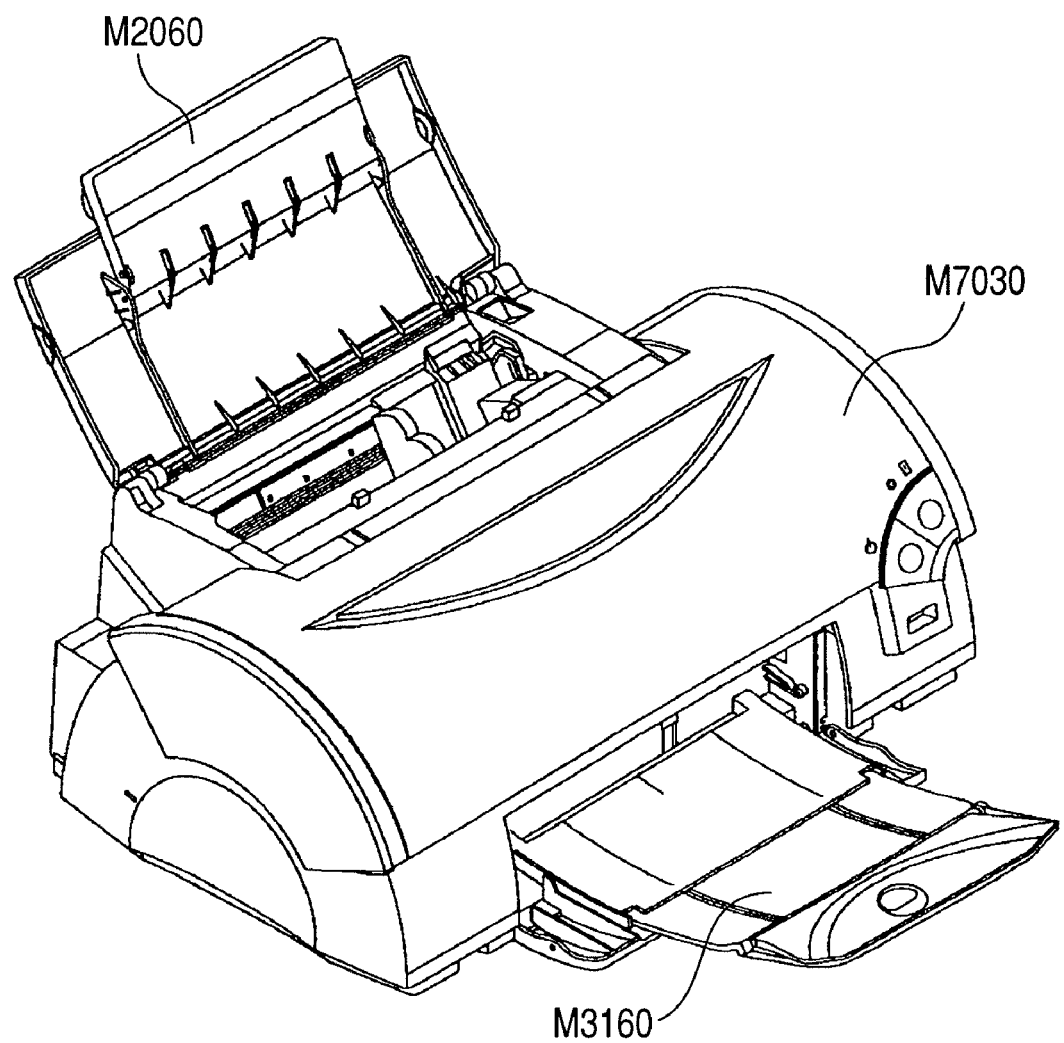
FIG. 2 is a perspective view of an ink jet recording apparatus.
Figure 3:
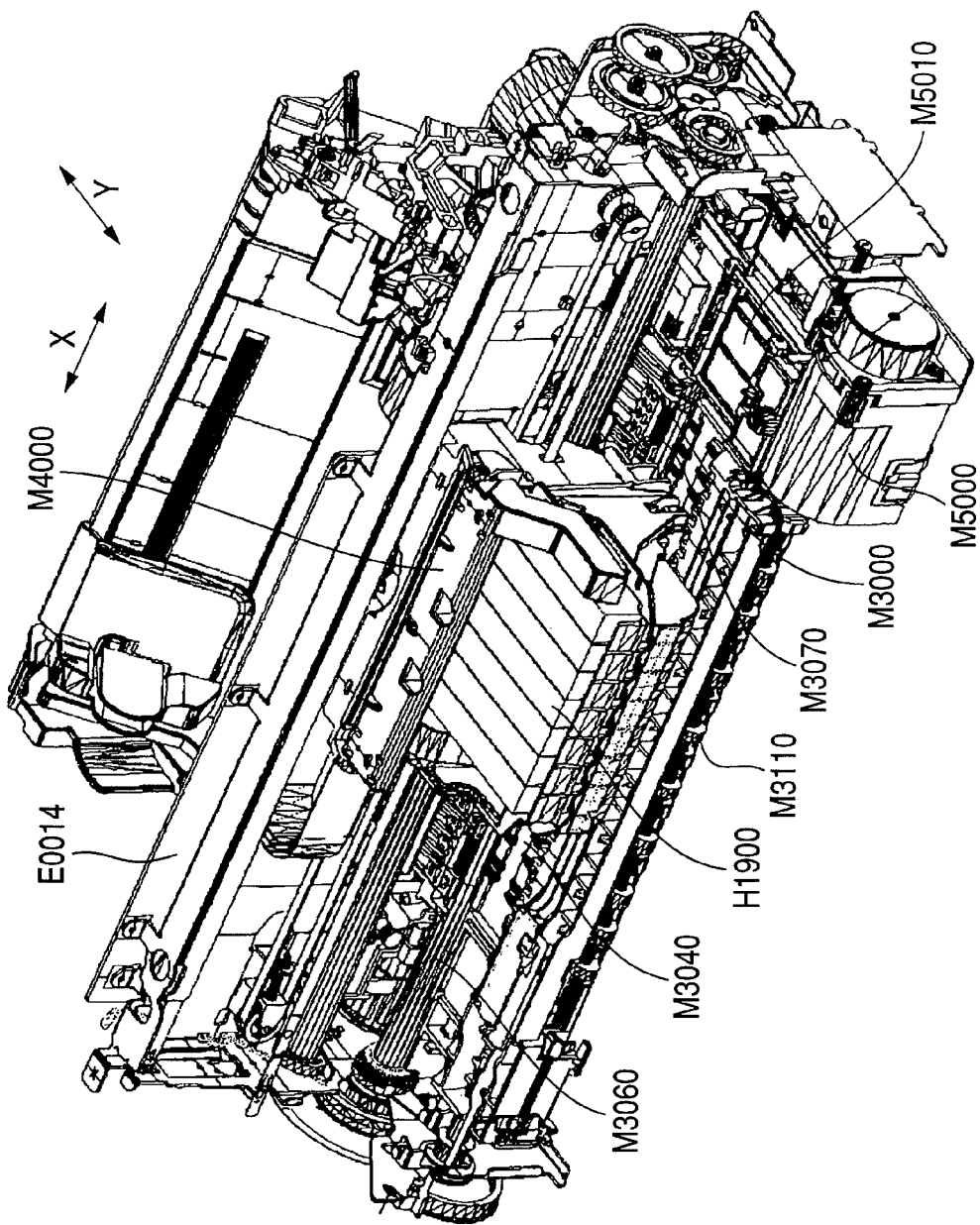
FIG. 3 is a perspective view of a mechanism part of the ink jet recording apparatus.
Figure 4:
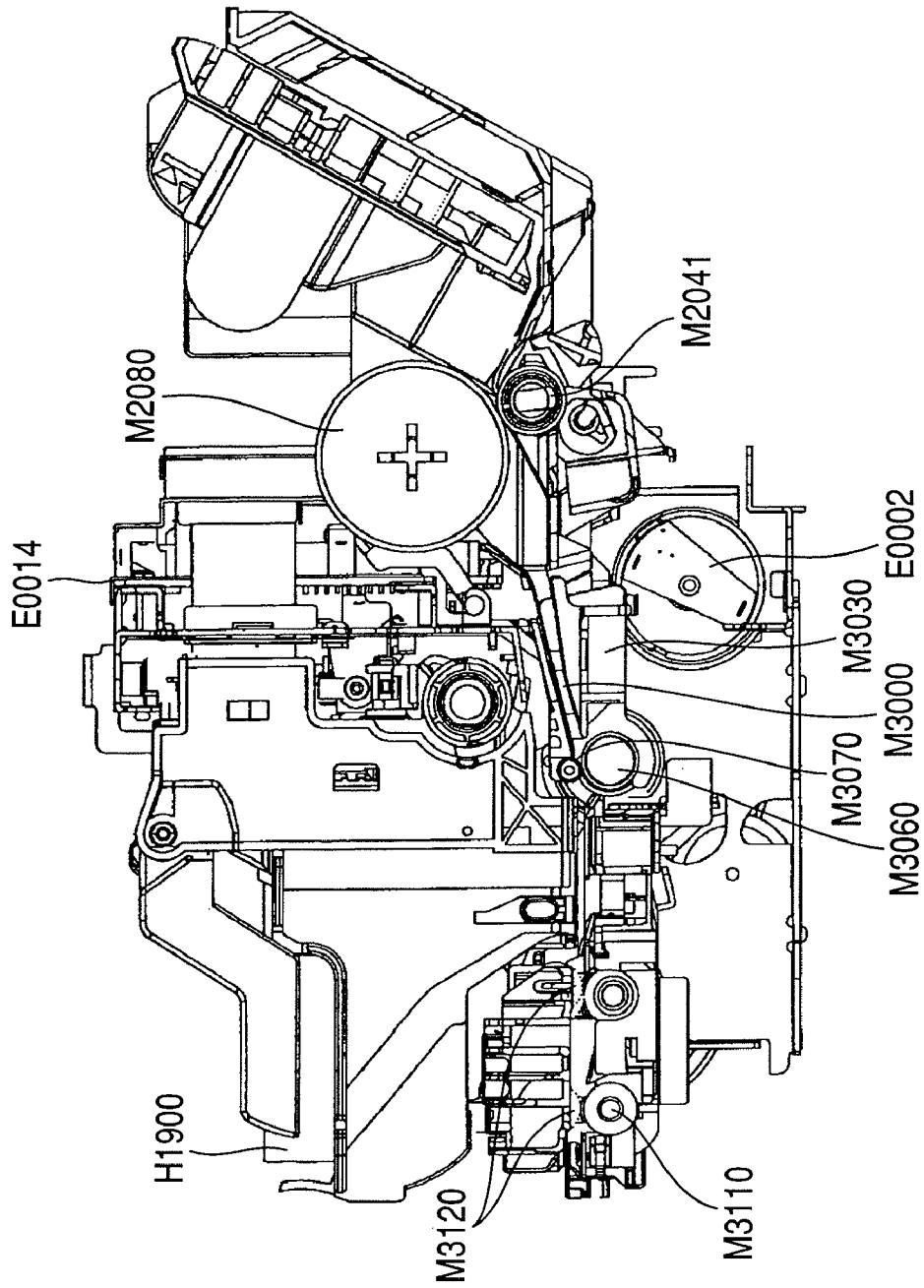
FIG. 4 is a sectional view of the ink jet recording apparatus.

FIG. 2 is a perspective view of the ink jet recording apparatus. FIGS. 3 and 4 are drawings illustrating the internal mechanism of the ink jet recording apparatus, in which FIG. 3 is a perspective view from the top right-hand, and FIG. 4 is a sectional side elevation of the ink jet recording apparatus.

Upon feeding of paper, only a predetermined number of recording media is sent to a nip portion constructed by a paper feed roller M2080 and a separating roller M2041 in the paper feeding portion including a paper feeding tray M2060. The recording media are separated in the nip part, and only a recording medium located uppermost is conveyed. The recording medium sent to the conveying portion is guided to a pinch roller holder M3000 and a paper guide flapper M3030 and conveyed to a pair of rollers of a conveying roller M3060 and a pinch roller M3070. The pair of rollers having the conveying roller M3060 and the pinch roller M3070 is rotated by driving of an LF motor E0002, and the recording medium is conveyed on a platen M3040 by this rotation.

Upon forming of an image on the recording medium, the carriage portion arranges a recording head H1001 (FIG. 5; detailed construction will be described subsequently) at an intended image forming position, and an ink is ejected on the recording medium according to a signal from an electric substrate E0014. While conducting recording by the recording head H1001, main scanning in which a carriage M4000 scans in a column direction and secondary scanning in which the conveying roller M3060 conveys the recording medium in a row direction are alternately repeated, thereby forming an image on the recording medium. The recording medium on which the image has been formed is conveyed being nipped between a first paper discharging roller M3110 and a spur M3120 in the paper discharging portion and discharged on a paper discharging tray M3160.

In the cleaning portion, the recording head H1001 before and after the recording is cleaned. When a pump M5000 is operated under the condition where ejection orifices of the recording head H1001 are capped with a cap M5010, an unnecessary ink is sucked from the ejection orifices of the recording head H1001. The ink remaining in the cap M5010 is sucked with the cap being opened, whereby sticking by the remaining ink and other troubles are prevented.

(Construction of Recording Head)

Figure 5:
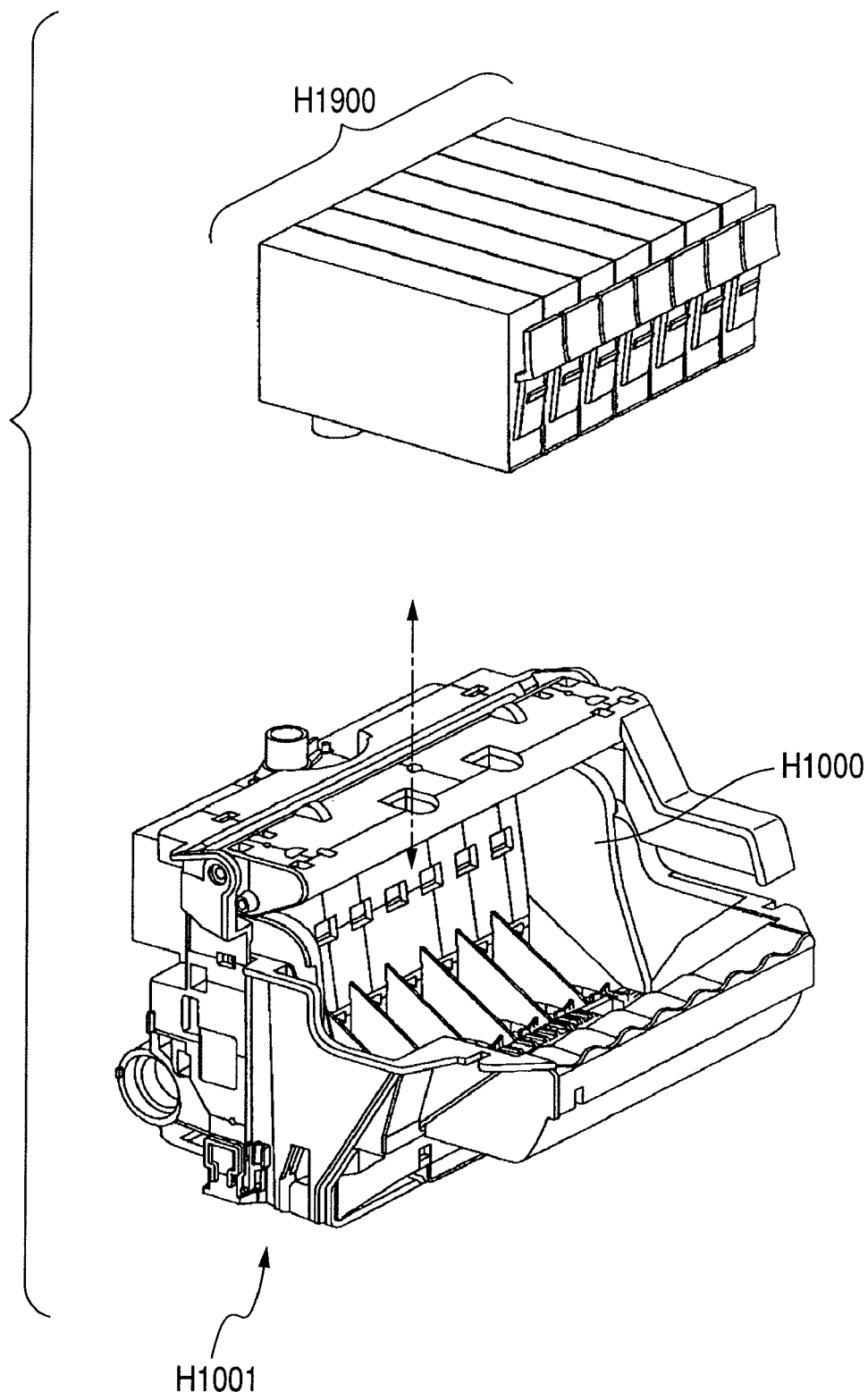
FIG. 5 is a perspective view illustrating a state where an ink cartridge is installed in a head cartridge.

The construction of a head cartridge H1000 will be described. FIG. 5 illustrates the construction of the head cartridge H1000 and a manner of installing an ink cartridge H1900 in the head cartridge H1000. The head cartridge H1000 has a recording head H1001, a unit for installing the ink cartridge H1900 and a unit for feeding an ink from the ink cartridge H1900 to the recording head and is detachably installed on the carriage M4000.

The ink jet recording apparatus forms an image with respective inks of yellow, magenta, cyan, black, light magenta, light cyan and green. Accordingly, ink cartridges H1900 for the 7 colors are independently provided. Incidentally, the ink according to the present invention is used as at least one ink of the inks described above. As illustrated in FIG. 5, each ink cartridge H1900 is detachably installed in the head cartridge H1000. Incidentally, installation and detachment of the ink cartridges H1900 can be performed under the condition where the head cartridge H1000 is installed on the carriage M4000.

Figure 6:
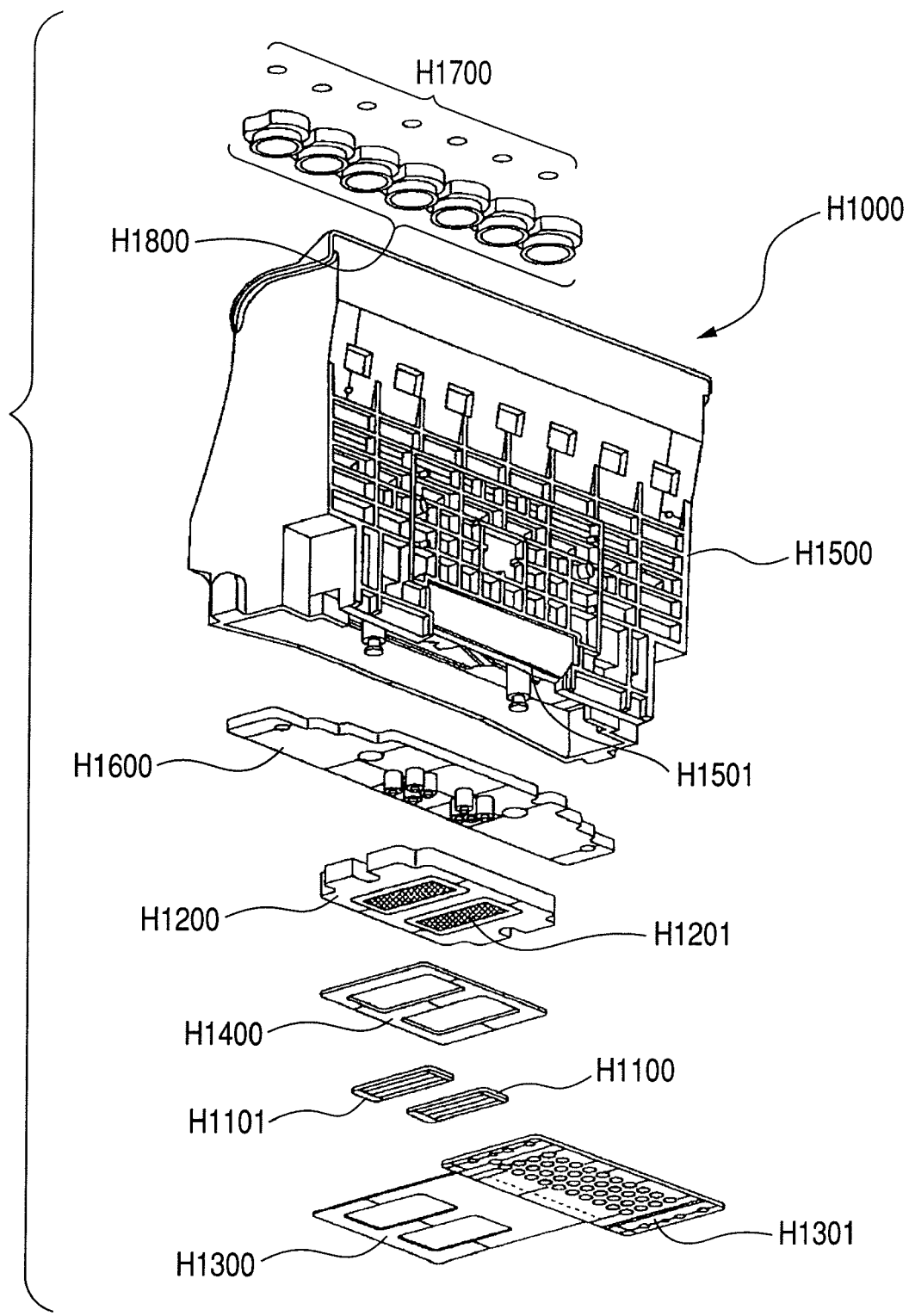
FIG. 6 is an exploded perspective view of the head cartridge.

FIG. 6 is an exploded perspective view of the head cartridge H1000. The head cartridge H1000 is constructed by a recording element substrate, a plate, an electric wiring substrate H1300, a cartridge holder H1500, a flow path forming member H1600, filters H1700 and a seal rubber H1800. The recording element substrate is constructed by a first recording element substrate H1100 and a second recording element substrate H1101, and the plate is constructed by a first plate H1200 and a second plate 1400.

The first recording element substrate H1100 and the second recording element substrate H1101 are Si substrates, and a plurality of recording elements (nozzles) for ejecting an ink is formed in one surfaces thereof by a photolithographic technique. An electric wiring formed of Al for supplying electric power to each recording element is formed by a film forming technique. A plurality of ink flow paths corresponding to the individual recording elements is also formed by the photolithographic technique. Ink supply openings for supplying inks to a plurality of the ink flow paths are formed so as to open to a back surface.

Figure 7:
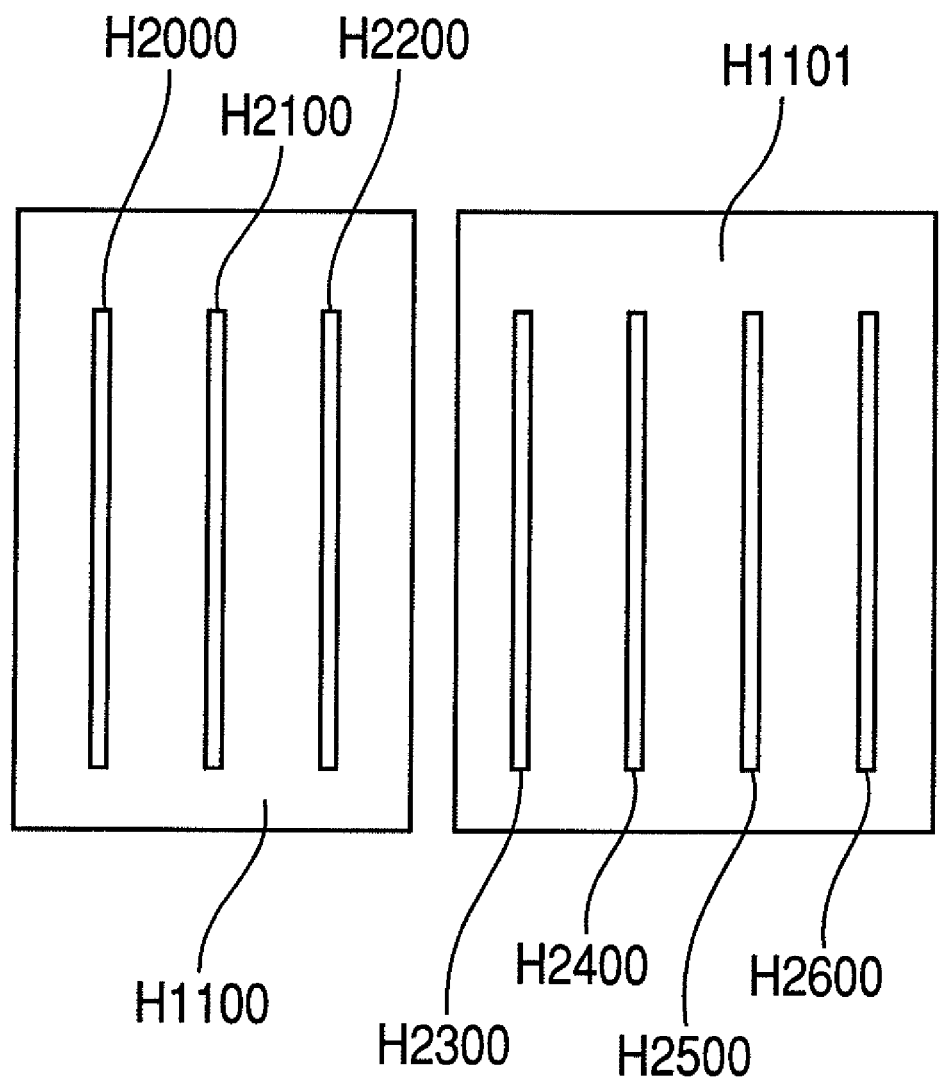
FIG. 7 is an elevational view illustrating recording element substrates in the head cartridge.

FIG. 7 is an enlarged elevational view illustrating the constructions of the first recording element substrate H1100 and the second recording element substrate H1101. Rows H2000 to H2600 (hereinafter also referred to as nozzle rows) of recording elements correspond to the respective inks of different colors. In the first recording element substrate H1100, there are formed nozzle rows for 3 colors: a nozzle row H2000 for the yellow ink, a nozzle row H2100 for the magenta ink and a nozzle row H2200 for the cyan ink. In the second recording element substrate H1101, there are formed nozzle rows for 4 colors: a nozzle row H2300 for the light cyan ink, a nozzle row H2400 for the black ink, a nozzle row H2500 for the green ink and a nozzle row H2600 for the light magenta ink.

Each nozzle row is formed by 768 nozzles arranged at intervals of 1,200 dpi (dots/inch; referential value). About 2 picoliters of an ink is ejected from each nozzle. An opening area in each ejection orifice is set to about 100 $\mu m^2$.

Description is given with reference to FIGS. 5 and 6. The first recording element substrate H1100 and second recording element substrate H1101 are bonded and fixed to the first plate H1200. In the first plate, there are formed ink supply openings H1201 for supplying inks to the first recording element substrate H1100 and second recording element substrate H1101. Further, the second plate H1400 having openings is bonded and fixed to the first plate H1200. This second plate H1400 holds the electric wiring substrate H1300 so as to electrically connect the electric wiring substrate H1300 to the first recording element substrate H1100 and second recording element substrate H1101.

The electric wiring substrate H1300 applies an electric signal for ejecting an ink from each nozzle formed in the first recording element substrate H1100 and second recording element substrate H1101. This electric wiring substrate H1300 has electric wirings corresponding to the first recording element substrate H1100 and second recording element substrate H1101, and external signal input terminals H1301 located at edges of the electric wirings for receiving electric signals from the ink jet recording apparatus. The external signal input terminals H1301 are positioned and fixed on the back surface side of the cartridge holder H1500.

The flow path forming member H1600 is fixed to the cartridge holder H1500 for holding the ink cartridges H1900 by, for example, ultrasonic welding to form ink flow paths H1501 linking to the ink cartridges H1900 to the first plate H1200. The filters H1700 are provided at ends on the ink cartridge side of the ink flow paths H1501 linking to the ink cartridges H1900 so as to prevent invasion of dust from the outside. The sealing rubber H1800 is fitted to portions engaged with the ink cartridges H1900 so as to prevent evaporation of the inks from the engaged portions.

A cartridge holder portion is bonded to the recording head portion H1001 by, for example, adhesion, thereby forming the head cartridge H1000. Incidentally, the cartridge holder portion is constructed by the cartridge holder H1500, the flow path forming member H1600, the filters H1700 and the sealing rubber H1800. The recording head portion H1001 is constructed by the first recording element substrate H1100, the second recording element substrate H1101, the first plate H1200, the electric wiring substrate H1300 and the second plate H1400.

The recording head of the thermal ink jet system in which recording is conducted using electrothermal converters (recording elements), which generate thermal energy for causing an ink to cause film boiling corresponding to an electric signal, has been described as an embodiment of the recording head herein. Typical construction and principle thereof are favorably those which perform recording by using fundamental principles disclosed in, for example, U.S. Pat. Nos. 4,723, 129 and 4,740,796. This system can be applied to any one of those called On-Demand type or continuous type.

It is particularly effective to apply the thermal ink jet system to the On-Demand type. In the case of the On-Demand type, at least one driving signal, which corresponds to recording information and gives a rapid temperature rise exceeding nuclear boiling, is applied to an electrothermal converter arranged corresponding to a liquid flow path, in which an ink is retained, thereby causing the electrothermal converter to generate thermal energy to cause film boiling in the ink. As a result, a bubble can be formed in the ink in response to the driving signal in relation of one-to-one. The ink is ejected through an ejection orifice by the growth-contraction of this bubble to form at least one droplet. When the driving signal is applied in the form of a pulse, the growth-contraction of the bubble is suitably conducted in a moment, so that the ejection of the ink, which is excellent in responsiveness in particular, can be achieved. It is therefore favorable to use such pulsed signals.

The ink according to the present invention may also be favorably used in such an ink jet recording apparatus utilizing mechanical energy as described below, not limited to the above-described thermal ink jet system. The ink jet recording apparatus of such system is equipped with a nozzle-forming substrate having a plurality of nozzles, pressure-generating elements arranged in an opposing relation to the nozzles and each composed of a piezoelectric material and an electrically conductive material, and an ink filled around the pressure-generating elements, in which the pressure-generating elements are displaced by applying a voltage to eject the ink from the nozzles.

The ink jet recording apparatus are not limited to the apparatus in which the recording head and the ink cartridges are separately provided as described above, and an apparatus in which these members are integrally formed without separating them may also be used. The ink cartridge may be separably or unseparably and integrally installed in a recording head and mounted on a carriage, or may be provided at a fixing portion of an ink jet recording apparatus to supply an ink to a recording head through an ink supply member such as a tube.

When a construction for applying a favorable negative pressure to a recording head is provided in an ink cartridge, the following construction may be adopted. More specifically, a mode in which an absorbing member is arranged in an ink storage portion of the ink cartridge or a mode in which a flexible ink-storing bag and a spring portion for applying biasing force to the bag in a direction expanding the internal volume of the bag are arranged may be used. The ink jet recording apparatus may also use a mode of a line printer type in which recording elements are arranged over a range corresponding to the overall width of a recording medium in addition to a recording system of such serial type as described above.

EXAMPLES

The present invention will hereinafter be described in more detail by the following Examples and Comparative Examples. However, the present invention is not limited to the following examples at all unless going beyond the gist of the present invention. Incidentally, all designations of "part" or "parts" and "%" mean part or parts by mass and % by mass unless expressly noted.

<Preparation of Coloring Material>

Synthesis of Exemplified Compound 5 and measurement of characteristic values Exemplified Compound 5 (potassium salt) was prepared according to the following synthetic flow and procedure.

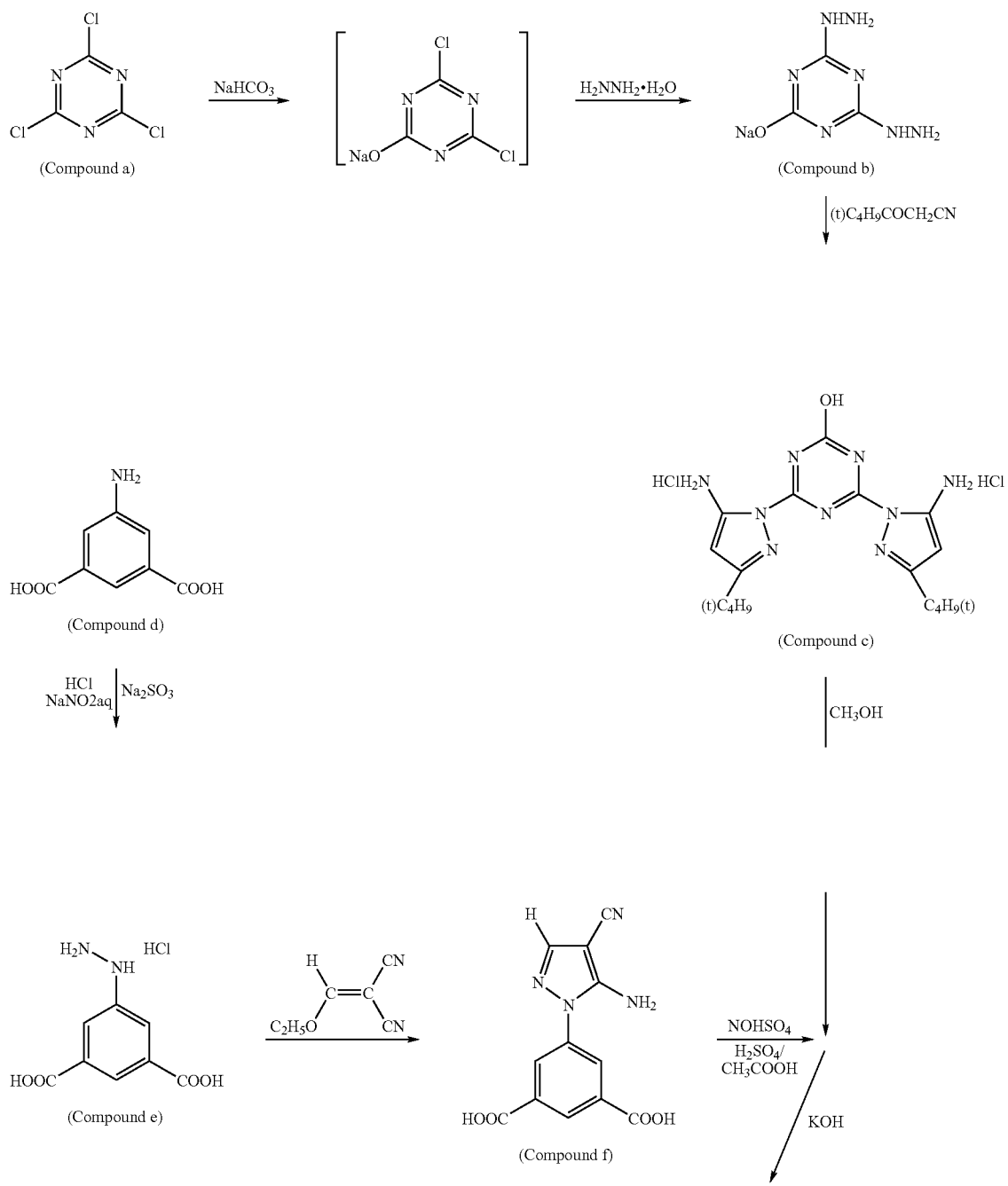

-continued

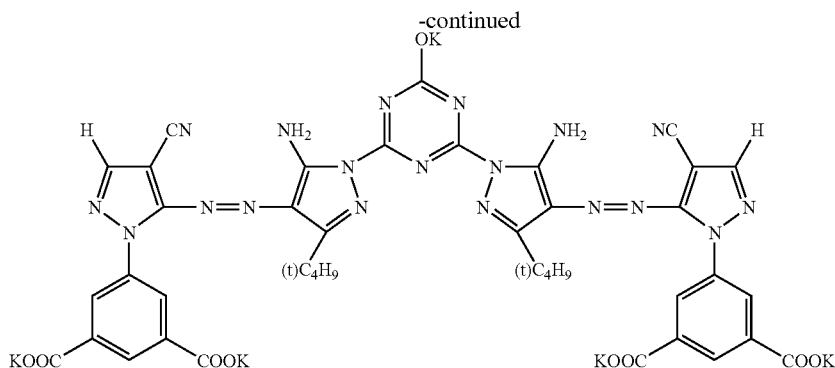

(Exemplified compound 5)

(1) Synthesis of Compound b

A solution was prepared by mixing 25.5 g of sodium hydrogencarbonate and 150 mL of ion-exchanged water, heating the resultant mixture to 40° C., adding 25.0 g of cyanuric chloride (product of TOKYO CHEMICAL INDUSTRY CO., LTD.; Compound a) to the mixture in 5 equally divided portions at intervals of 10 minutes and stirring the mixture for 1 hour. The solution thus obtained was added dropwise into a mixed liquid (8° C.) of 52.8 mL of hydrazine monohydrate and 47 mL of ion-exchanged water such that the internal temperature does not exceed 10° C. Thereafter, the internal temperature was raised to 50° C., and stirring was conducted for 30 minutes. Crystals deposited were collected by filtration to obtain 23.4 g of Compound b (hydrazine derivative, melting point>300° C.). The yield was 94.7%.

(2) Synthesis of Compound c 35.0 g of Compound b (hydrazine derivative) obtained above was suspended in 420 mL of ethylene glycol, and the internal temperature was controlled to 50° C. to conduct stirring. To this suspension, 59 mL of concentrated hydrochloric acid was added, and 60.1 g of pivaloylacetonitrile (product of TOKYO CHEMICAL INDUSTRY CO., LTD.) was then added to the resultant mixture to conduct stirring for 10 hours at 50° C., to which 95 mL of concentrated hydrochloric acid and 145 mL of methanol were added, followed by stirring for additional 8 hours. After cooling to room temperature, the precipitated crystal was collected by filtration to obtain 81.6 g of Compound c (5-aminopyrazole derivative, melting point=233 to 235° C.). The yield was 94.2%.

(3) Synthesis of Compound e 90.57 g of Compound d (product of TOKYO CHEMICAL INDUSTRY CO., LTD.) was suspended in 500 mL of water, 130 mL of concentrated hydrochloric acid was added to this suspension, and the resultant mixture was cooled until the internal temperature after the addition reached 5° C. or less. Then, 70 mL of an aqueous solution containing 36.23 g of sodium nitrite was added dropwise at an internal temperature ranging from 4 to 6° C., and the internal temperature was controlled to 5° C. or less to conduct stirring for 30 minutes. Then, 159 g of sodium nitrite and 636 mL of water were added while retaining the internal temperature to 20° C. or less, the internal temperature was controlled to 25° C. to add 250 mL of concentrated hydrochloric acid, and the internal temperature was then controlled to 90° C. to conduct stirring for 1 hour. Thereafter, the internal temperature was lowered to room temperature, filtration was conducted, washing was conducted with 200 mL of water, and the washed product was then air-dried to obtain 80.0 g of Compound e.

(4) Synthesis of Compound f 23.3 g of Compound e obtained above was suspended in 209 mL of ethanol, and 28 mL of triethylamine was added dropwise to this suspension at room temperature. Thereafter, 12.2 g of ethoxymethylenemalononitrile (product of ALDRICH) was added to the resultant mixture in several divided portions. After refluxing was conducted for 3 hours, the reaction mixture was cooled to room temperature and filtered, and the resultant product was washed with 400 mL of isopropyl alcohol and then dried to obtain 23.57 g of Compound f.

(5) Synthesis of Exemplified Compound 5

The internal temperature was controlled to 4° C. or less to add 145.56 mL of acetic acid to 32.4 mL of sulfuric acid, and the internal temperature was controlled to 7° C. or less to add 15.9 mL of 40% by mass nitrosylsulfuric acid (product of ALDRICH) dropwise under stirring. 32.4 g of Compound f obtained above was added to this mixture in several divided portions, and the internal temperature was controlled to 10° C. to conduct stirring for 60 minutes. Thereafter, the diazonium salt of Compound f was added dropwise to a suspension of 18.8 g of Compound c to which 1.83 g of urea had been added in 470 mL of methanol while controlling the internal temperature to less than 0° C., and the internal temperature was kept at less than 0° C. to conduct stirring for 30 minutes. Thereafter, the internal temperature of the reaction mixture was raised to room temperature, the reaction mixture was filtered, and the resultant product was washed with methanol and additionally with water to obtain crude crystal. The resultant crystal was suspended in 400 mL of methanol, the suspension was stirred for 60 minutes under refluxing, cooled to room temperature and then filtered, and the resultant product was washed with methanol, water and methanol in that order and then dried overnight at 75° C. to obtain 34.4 g of a free acid type crystal of Exemplified Compound 5. After the resultant crystal was dissolved in water to obtain a 10% by mass aqueous solution (25° C., pH=about 8.3; adjusted with an aqueous solution of KOH), isopropanol was added at the internal temperature of 50° C. to conduct crystallization, the contents were cooled and then filtered, and the resultant product was washed with isopropanol and dried. In this manner, 35.0 g of Exemplified Compound 5 (potassium salt) was obtained.

<$M_{OH}/M_W$ of Organic Solvents>

With respect to the organic solvents used in the preparation of inks, the proportion $M_{OH}/M_W$ was determined, and the results thereof are shown in the following Table 2.

TABLE 2

$M_{OH}/M_W$ of organic solvents

| Organic solvent | | |
|---|---|---|
| Classification | Kind | $M_{OH}/M_W$ |
| A | 2-Pyrrolidone | 0.00 |
|  | Ethylene urea | 0.00 |
|  | Urea | 0.00 |
|  | Triethylene glycol monobutyl ether | 0.08 |
| B | Bis(2-hydroxyethyl) sulfone | 0.22 |
|  | Triethylene glycol | 0.23 |
|  | Diethylene glycol | 0.32 |
|  | 3-Methoxy-1,2-propanediol | 0.32 |
|  | 1,5-Pentanediol | 0.33 |
|  | Triethanolamine | 0.34 |
| C | 1,2-Propanediol | 0.45 |
|  | Glycerol | 0.55 |

<Preparation of Inks>

Exemplified Compound 5 that is a yellow coloring material obtained above was used to prepare inks by mixing and sufficiently stirring their corresponding respective components shown in the following Table 3 and then filtering the resultant respective mixtures under pressure through a filter having a pore size of 0.2 μm.

TABLE 3

1 Compositions of inks (Unit: %)

| | | | Example 1 | 2 | 3 | 4 | 5 | 6 | 7 | 8 | 9 |
|---|---|---|---|---|---|---|---|---|---|---|---|
| Organic solvent | A | 2-Pyrrolidone | 9.6 | 10.0 | 3.0 | 12.0 | 2.0 | 13.0 | 10.0 | 10.0 | 10.0 |
| | | Ethylene urea | | | | | | | | | |
| | | Urea | | | | | | | | | |
| | | Triethylene glycol monobutyl ether | | | | | | | | | |
| | B | Bis(2-Hydroxyethyl) sulfone | 2.4 | | | | | | | | |
| | | Triethylene glycol | 7.2 | 7.5 | 7.5 | 7.5 | 7.5 | 7.5 | 0.5 | 12.5 | |
| | | Diethylene glycol | | | | | | | | | |
| | | 3-Methoxy-1,2-propanediol | 3.4 | | | | | | | | |
| | | 1,5-Pentanediol | | 2.5 | 2.5 | 2.5 | 2.5 | 2.5 | 2.5 | 2.5 | 2.0 |
| | | Triethanolamine | | | | | | | | | |
| | C | Glycerol | 4.8 | 7.5 | 7.5 | 7.5 | 7.5 | 7.5 | 7.5 | 7.5 | 7.5 |
| | | 1,2-Propanediol | | | | | | | | | |
| Exemplified Compound 5 | | | 3.0 | 3.0 | 3.0 | 3.0 | 3.0 | 3.0 | 3.0 | 3..0 | 3.0 |
| Acetylenol E100 (*1) | | | 0.8 | 0.6 | 0.6 | 0.6 | 0.6 | 0.6 | 0.6 | 0.6 | 0.6 |
| Ion-exchanged water | | | 68.8 | 68.9 | 75.9 | 66.9 | 76.9 | 65.9 | 75.9 | 63.9 | 76.9 |

2 Composition of inks (Unit: %)

| | | | Example 10 | 11 | 12 | 13 | 14 | 15 | 16 | 17 | 18 |
|---|---|---|---|---|---|---|---|---|---|---|---|
| Organic solvent | A | 2-Pyrrolidone | 10.0 | 10.0 | 10.0 | 10.0 | 10.0 | | 10.0 | 10.0 | 8.0 |
| | | Ethylene urea | | | | | | | | | |
| | | Urea | | | | | | 10.0 | | | |
| | | Triethylene glycol monobutyl ether | | | | | | | | | 2.0 |
| | B | Bis(2-Hydroxyethyl) sulfone | | | | | | | | | |
| | | Triethylene glycol | 13.5 | 7.5 | 7.5 | 7.5 | 7.5 | 7.5 | 7.5 | 7.5 | |
| | | Diethylene glycol | | | | | | | | | 7.0 |
| | | 3-Methoxy-1,2-propanediol | | | | | | | | | |
| | | 1,5-Pentanediol | 2.5 | 2.5 | 2.5 | 2.5 | 2.5 | 2.5 | 2.5 | 2.5 | |
| | | Triethanolamine | | | | | | | | | 0.8 |
| | C | Glycerol | 7.5 | 2.0 | 12.0 | 1.0 | 13.0 | 7.5 | 7.5 | 7.5 | 11.5 |
| | | 1,2-Propanediol | | | | | | | | | |

TABLE 3-continued

| | | | | | | | | | |
|---|---|---|---|---|---|---|---|---|---|
| Exemplified Compound 5 | 3.0 | 3.0 | 3.0 | 3.0 | 3.0 | 3.0 | 3.0 | 3.0 | 3.0 |
| Acetlenol E100 (*1) | 0.6 | 0.6 | 0.6 | 0.6 | 0.6 | 0.6 | 1.9 | 2.0 | 1.0 |
| Ion-exchanged water | 62.9 | 74.4 | 64.4 | 75.4 | 63.4 | 68.9 | 67.6 | 67.5 | 66.7 |

3
Compositions of inks (Unit: %)

| | | | Comparative Example | | | | | | | |
|---|---|---|---|---|---|---|---|---|---|---|
| | | | 1 | 2 | 3 | 4 | 5 | 6 | 7 | 8 |
| Organic solvent | A | 2-Pyrrolidone | | | | | 3.5 | | | 2.0 |
| | | Ethylene urea | | | | 7.5 | | 10.0 | 10.0 | |
| | | Urea | | | | | | | | 1.0 |
| | | Triethylene glycol monobutyl ether | | 10.0 | 12.4 | 2.5 | 10.0 | | | 10.1 |
| | B | Bis(2-Hydroxyethyl) sulfone | | | | | | | | |
| | | Triethylene glycol | | 11.0 | 10.7 | | | | | 9.5 |
| | | Diethylene glycol | | | | 7.0 | 7.0 | | | |
| | | 3-Methoxy-1,2-propanediol | 7.5 | | | | | | 10.0 | |
| | | 1,5-Pentanediol | 5.0 | | | | | | 5.0 | |
| | | Triethanolamine | | | | 0.8 | 0.8 | | | 1.0 |
| | C | Glycerol | 7.5 | 11.0 | 8.9 | 11.5 | 11.5 | 15.0 | | 11.8 |
| | | 1,2-Propanediol | | 0.2 | 0.1 | | | | | |
| Exemplified Compound 5 | | | 3.0 | 3.0 | 3.0 | 3.0 | 3.0 | 3.0 | 3.0 | 3.0 |
| Acetylenol E100 (*1) | | | 0.8 | 0.6 | 0.6 | 1.0 | 1.0 | 0.8 | 0.8 | 1.0 |
| Ion-exchanged water | | | 76.2 | 64.2 | 64.3 | 66.7 | 63.2 | 71.2 | 71.2 | 60.6 |

(*1) Surfactant (product of Kawaken Fine Chemicals)

<Evaluation>
(Decomposition Resistance)

The degree of decomposition of the coloring material in each ink was verified by storing the ink for 7 days at 70° C. to determine the peak of the coloring material by means of high-performance liquid chromatography (HPLC) as to the ink before and after the storage and regarding the rate of decrease of the peak area of the coloring material before and after the storage as the decomposition rate of the coloring material.

The analysis conditions of the high-performance liquid chromatography are as follows: A liquid (ink) diluted to about 1/1,000 with pure water was used as a sample for measurement, and analysis by the high-performance liquid chromatography was conducted under the following conditions:

Column: SunFire $C_{18}$ (manufactured by Nihon Waters K.K.), 2.1 mm×150 mm;
Column temperature: 40° C.;
Flow rate: 0.2 mL/min;
PDA: 200 nm to 700 nm;
Mobile phase and gradient conditions: see Table 4.

TABLE 4

| Mobile phase and gradient conditions | | | | |
|---|---|---|---|---|
| | 0 to 5 min | 5 to 24 min | 24 to 31 min | 31 to 45 min |
| A: water | 85% | 85 → 45% | 45 → 0% | 0% |
| B: methanol | 10% | 10 → 50% | 50 → 95% | 95% |
| C: 0.2 mol/L aqueous solution of ammonium acetate | 5% | 5% | 5% | 5% |

The evaluation criteria of the decomposition resistance are as follows. The evaluation results are shown in Table 5. Incidentally, in the present invention, B or more in the following evaluation criteria were regarded as an allowable level, and particularly, A was regarded as an excellent level, and C was regarded as an unallowable level.

A: The decomposition rate was less than 20%
B: The decomposition rate was 20% or more and less than 25%
C: The decomposition rate was 25% or more (Sticking Resistance)

Each of the inks obtained above was charged into an ink cartridge for an ink jet recording apparatus (trade name: PIXUS iP8600; manufactured by Canon Inc.). This ink cartridge was installed in a head cartridge of the ink jet recording apparatus. Thereafter, the head cartridge was taken out of the ink jet recording apparatus and stored for 2 weeks in an environment of a temperature of 35° C. and a humidity of 10% with ejection orifices being exposed. Thereafter, the head cartridge was installed in the same ink jet recording apparatus as described above again, Suction was conducted predetermined times to confirm recoverability, thereby evaluating the sticking resistance of the ink. Incidentally, the suction means "cleaning of a printing head" that is a function of the ink jet recording apparatus. The evaluation criteria of the sticking resistance are as follows. The evaluation results thus obtained are shown in Table 5. Incidentally, in the present invention, B2 or more in the following evaluation criteria were regarded as an allowable level, and particularly, B1 and A were regarded as a good level and an excellent level, respectively, and C was regarded as an unallowable level.

A: All ejection orifices were recovered to an ejectable state by conducting suction 4 times or less
B1: All ejection orifices were recovered to an ejectable state by conducting suction 5 times
B2: All ejection orifices were recovered to an ejectable state by conducting suction 6 times
C: Some ejection orifices were not recovered even by conducting suction 7 times or more (Ejection Stability)

Each of the inks obtained above was charged into an ink cartridge for an ink jet recording apparatus (trade name:

PIXUS iP8600; manufactured by Canon Inc.). This ink cartridge was installed in a head cartridge of the ink jet recording apparatus. Thereafter, the ink jet recording apparatus was left to stand in an environment of 15° C. in temperature and 10% in humidity, the ink was then ejected from a certain nozzle, and the nozzle was then left to stand for 1 minute without capping it. A recorded article formed by ejecting the ink from the nozzle was visually observed to make evaluation as to the ejection stability. The evaluation criteria of the ejection stability are as follows. The evaluation results thus obtained are shown in Table 5. Incidentally, in the present invention, B2 or more in the following evaluation criteria were regarded as an allowable level, and particularly, B1 and A were regarded as a good level and an excellent level, respectively, and C was regarded as an unallowable level.

A: Normal recording was able to be conducted

B1: Recording disorder was observed in less than 2 nozzles

B2: Recording disorder was observed in 2 nozzles or more and less than 5 nozzles C: Ejection could not be conducted from some of the ejection orifices

TABLE 5

Evaluation results

| | | Decomposition resistance | Decomposition rate (%) | Sticking resistance | Ejection stability |
|---|---|---|---|---|---|
| Example | 1 | A | 19 | A | A |
| | 2 | A | 16 | A | A |
| | 3 | A | 17 | A | B1 |
| | 4 | A | 16 | A | B1 |
| | 5 | A | 17 | A | B2 |
| | 6 | A | 15 | A | B2 |
| | 7 | A | 15 | B1 | A |
| | 8 | A | 18 | A | B1 |
| | 9 | A | 15 | B2 | A |
| | 10 | A | 19 | A | B2 |
| | 11 | A | 12 | B1 | A |
| | 12 | B | 22 | A | A |
| | 13 | A | 10 | B2 | A |
| | 14 | B | 24 | A | A |
| | 15 | B | 20 | B2 | A |
| | 16 | A | 16 | A | B1 |
| | 17 | A | 16 | A | B2 |
| | 18 | B | 23 | A | B2 |
| Comparative Example | 1 | B | 20 | A | C |
| | 2 | A | 19 | A | C |
| | 3 | A | 19 | A | C |
| | 4 | B | 23 | A | C |
| | 5 | B | 22 | A | C |
| | 6 | C | 26 | A | A |
| | 7 | A | 10 | C | A |
| | 8 | B | 20 | A | C |

(Organic Solvent A)

From the results of Comparative Examples 1 to 8 and Examples 1 to 18, it is understood that the inks containing the organic solvent A 80.0% or more of which is a nitrogen-containing solvent are far excellent in ejection stability. From the results of Examples 3 to 6, it is understood that the content of the organic solvent A which is effective for ejection stability is 3.0% by mass or more and 12.0% by mass or less. From the results of Examples 2 and 15, it is understood that far excellent decomposition resistance and sticking resistance are obtained when the organic solvent A used is the cyclic nitrogen-containing organic solvent among the nitrogen-containing solvents.

(Organic Solvent B)

From the results of Comparative Example 6, it is understood that the ink containing no organic solvent B cannot achieve both the decomposition resistance and the sticking resistance. From the results of Examples 7 to 10, it is understood that the content of the organic solvent B for successfully achieving both the ejection stability and the sticking resistance is 3.0% by mass or more and 15.0% by mass or less.

(Organic Solvent C)

From the results of Comparative Example 7, it is understood that the ink containing no organic solvent C is markedly poor in sticking resistance. From the results of Examples 11 to 14, it is understood that the content of the organic solvent C at which both the decomposition resistance and the sticking resistance can be achieved is 2.0% by mass or more and 12.0% by mass or less.

(Surfactant)

From the results of Examples 16 and 17, it is understood that the content of the surfactant at which the ejection stability is not influenced is less than 2.0% by mass.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120088, filed May 2, 2008, which is hereby incorporated by reference herein in its entirety.

What is claimed is:

1. An ink jet ink comprising:

a compound represented by the following general formula (I); and organic solvents, wherein when the organic solvents are classified by $M_{OH}/M_W$, indicating a proportion of the total molecular weight of hydroxyl groups to the molecular weight of the organic solvent, into an organic solvent A whose $M_{OH}/M_W$ is 0 or more and less than 0.2, an organic solvent B whose $M_{OH}/M_W$ is 0.2 or more and less than 0.4, and an organic solvent C whose $M_{OH}/M_W$ is 0.4 or more and less than 1.0, the ink comprises at least one organic solvent A, at least one organic solvent B, and at least one organic solvent C, and wherein the at least one organic solvent A comprises a nitrogen-containing organic solvent in an amount of 80.0% by mass or more of the at least one organic solvent A, General formula (I)

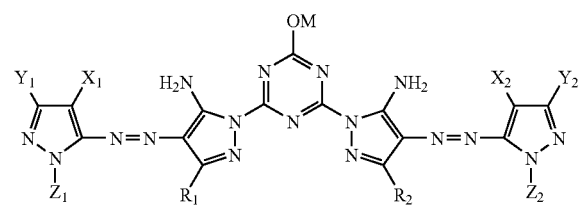

wherein $R_1$, $R_2$, $Y_1$, $Y_2$ are, independently of one another, a monovalent group, $X_1$ and $X_2$ are, independently of each other, an electron-withdrawing group having a Hammett's σp value of 0.20 or more, $Z_1$ and $Z_2$ are, independently of each other, a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M is a hydrogen atom, an alkali metal, an ammonium or an organic ammonium.

2. The ink jet ink according to claim 1, wherein a content of the organic solvent A is 3.0% by mass or more and 12.0% by mass or less based on the total mass of the ink.

3. The ink jet ink according to claim 1, wherein a content of the organic solvent B is 3.0% by mass or more and 15.0% by mass or less based on the total mass of the ink.

4. The ink jet ink according to claim 1, wherein a content of the organic solvent C is 2.0% by mass or more and 12.0% by mass or less based on the total mass of the ink.

5. The ink jet ink according to claim 1, wherein the nitrogen-containing organic solvent corresponding to the organic solvent A is a compound represented by the following general formula (III):

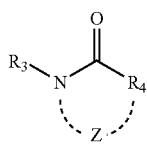

General formula (III)

wherein $R_3$ is a hydrogen atom, an alkyl group, a cycloalkyl group, an aralkyl group, an aryl group or acyl group, $R_4$ is N—$R_5$ or $CH_2$ ($R_5$ being a hydrogen atom or an alkyl group), and Z is an atomic group forming a monocyclic or polycyclic ring structure together with a urea group or a substituted or unsubstituted amide group in the general formula (III).

6. An ink jet recording method comprising ejecting an ink by an ink jet system to conduct recording on a recording medium, wherein the ink comprises the ink jet ink according to claim 1.

7. An ink cartridge comprising an ink storage portion storing an ink, wherein the ink comprises the ink jet ink according to claim 1.

8. A recording unit comprising an ink storage portion storing an ink and a recording head for ejecting the ink, wherein the ink comprises the ink jet ink according to claim 1.

9. An ink jet recording apparatus comprising an ink storage portion storing an ink and a recording head for ejecting the ink, wherein the ink comprises the ink jet ink according to claim 1.

* * * * *